US011322745B2

(12) United States Patent
Ikenuma et al.

(10) Patent No.: US 11,322,745 B2
(45) Date of Patent: May 3, 2022

(54) ELECTRODE, POWER STORAGE DEVICE, ELECTRONIC DEVICE, AND MANUFACTURING METHOD OF ELECTRODE

(71) Applicant: SEMICONDUCTOR ENERGY LABORATORY CO., LTD., Atsugi (JP)

(72) Inventors: Tatsuya Ikenuma, Shizuoka (JP); Kazutaka Kuriki, Kanagawa (JP); Ai Nakagawa, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 4 days.

(21) Appl. No.: 14/879,330

(22) Filed: Oct. 9, 2015

(65) Prior Publication Data
US 2016/0111700 A1    Apr. 21, 2016

(30) Foreign Application Priority Data
Oct. 15, 2014   (JP) .............................. JP2014-210591

(51) Int. Cl.
*H01M 4/62* (2006.01)
*H01M 4/139* (2010.01)
(Continued)

(52) U.S. Cl.
CPC ............ *H01M 4/628* (2013.01); *H01G 11/06* (2013.01); *H01G 11/38* (2013.01); *H01G 11/50* (2013.01); *H01M 4/13* (2013.01); *H01M 4/139* (2013.01); *H01M 4/366* (2013.01); *H01M 10/0525* (2013.01); *Y02E 60/13* (2013.01); *Y02T 10/70* (2013.01)

(58) Field of Classification Search
None
See application file for complete search history.

(56) References Cited

U.S. PATENT DOCUMENTS 4,346,142 A  *  8/1982  Lazear ............... B01D 67/0093
                                                         427/496
6,218,050 B1      4/2001  Yoon et al.
(Continued)

FOREIGN PATENT DOCUMENTS

JP    11-096993 A    4/1999
JP    11-224664 A    8/1999
(Continued)

OTHER PUBLICATIONS

Essential Chemical Industry—online (www.essentialchemicalindustry.org/polymers/silicones.html) (Year: 2014).*
(Continued)

*Primary Examiner* — Carmen V Lyles-Irving
(74) *Attorney, Agent, or Firm* — Nixon Peabody LLP; Jeffrey L. Costellia

(57) ABSTRACT

Provided is an electrode including a current collector and an active material layer. The active material layer includes an active material, a film including silicone, a conductive additive, and a binder. The active material is in the form of a particle. The film including silicone covers at least part of the active material.

22 Claims, 22 Drawing Sheets

(51) Int. Cl.
  *H01M 4/36* (2006.01)
  *H01M 4/13* (2010.01)
  *H01G 11/06* (2013.01)
  *H01G 11/50* (2013.01)
  *H01G 11/38* (2013.01)
  *H01M 10/0525* (2010.01)

(56) References Cited

U.S. PATENT DOCUMENTS

| | | |
|---|---|---|
| 7,358,011 B2 | 4/2008 | Fukuoka et al. |
| 8,906,547 B2 | 12/2014 | Taniguchi et al. |
| 2004/0080048 A1 | 4/2004 | Haruta et al. |
| 2009/0191465 A1* | 7/2009 | Hwang ............. H01M 4/386 429/331 |
| 2011/0045349 A1* | 2/2011 | Pushparaj ............ H01G 9/0029 429/212 |
| 2011/0177396 A1 | 7/2011 | Moriwaka et al. |
| 2011/0291240 A1 | 12/2011 | Yamazaki |
| 2012/0040242 A1* | 2/2012 | Kurasawa ........... H01M 4/0421 429/211 |
| 2012/0141866 A1 | 6/2012 | Kuriki et al. |
| 2012/0177992 A1* | 7/2012 | Miyoshi ............. H01M 4/134 429/211 |
| 2013/0052528 A1 | 2/2013 | Kuriki et al. |
| 2013/0078516 A1 | 3/2013 | Taniguchi et al. |
| 2013/0162197 A1 | 6/2013 | Takahashi et al. |
| 2013/0209868 A1 | 8/2013 | Suzuta et al. |
| 2013/0230772 A1 | 9/2013 | Noda et al. |
| 2013/0266858 A1 | 10/2013 | Inoue et al. |
| 2013/0323585 A1 | 12/2013 | Inoue et al. |
| 2014/0023921 A1* | 1/2014 | Lee ................. H01M 4/13 429/211 |
| 2014/0087251 A1 | 3/2014 | Takahashi et al. |
| 2014/0099554 A1 | 4/2014 | Inoue et al. |
| 2014/0127566 A1 | 5/2014 | Kuriki et al. |
| 2014/0127567 A1 | 5/2014 | Kuriki et al. |
| 2015/0262762 A1 | 9/2015 | Ikenuma et al. |
| 2016/0248086 A1* | 8/2016 | Ohsawa ............. H01M 4/366 |

FOREIGN PATENT DOCUMENTS

| | | |
|---|---|---|
| JP | 2004-014381 A | 1/2004 |
| JP | 2004-178917 A | 6/2004 |
| JP | 2005-302510 A | 10/2005 |
| JP | 2006-196338 A | 7/2006 |
| JP | 2010-244847 A | 10/2010 |
| JP | 2011-014298 A | 1/2011 |
| JP | 2013-149609 A | 8/2013 |
| WO | WO-2013/145925 | 10/2013 |

OTHER PUBLICATIONS

Inoue.N et al., "Improvement of cycle performance of lithium ion batteries at elevated temperature of 60° C. using graphite coated with metal oxide", 222nd ECS Meeting Abstract, Oct. 7, 2012, p. 654, ECS.

Zempachi Ogumi et al., "6.1.6 Influence of Electrolytic Solution and Surface Film Formation", Lithium Secondary Battery, Mar. 20, 2008, pp. 116-124, OHMSHA.

IUPAC Compendium of Chemical Terminology Gold Book, version 2.3.32014, https://goldbook.iupac.org/, Feb. 24, 2014.

\* cited by examiner

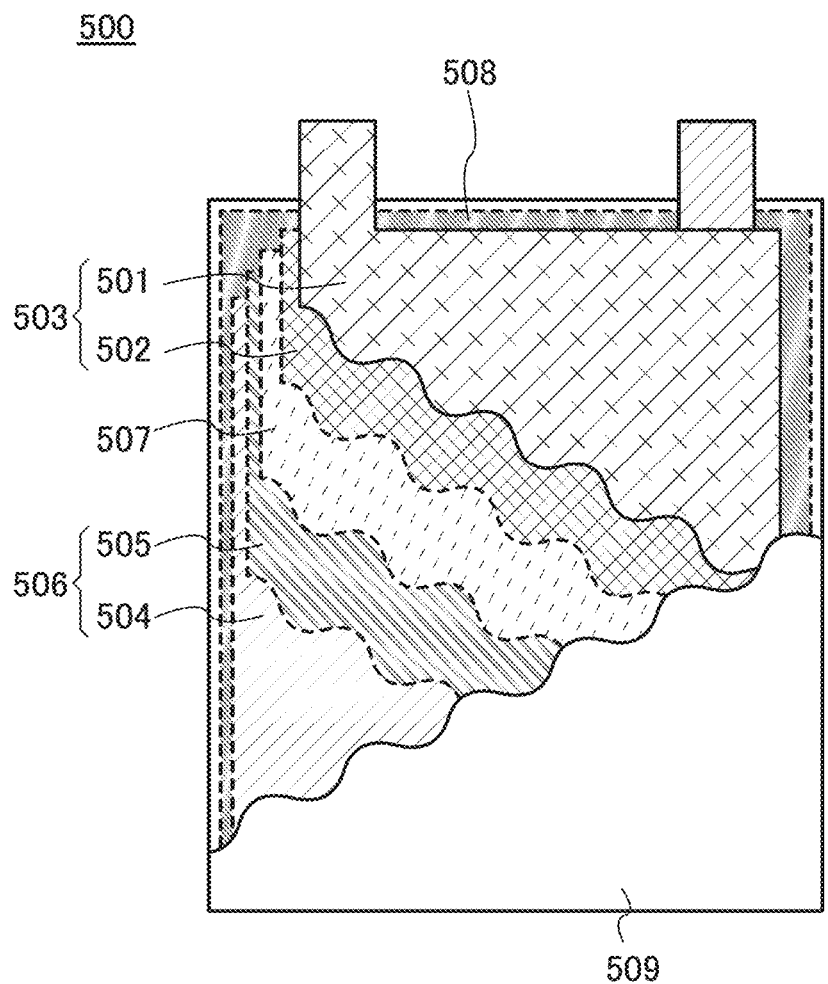

FIG. 9A
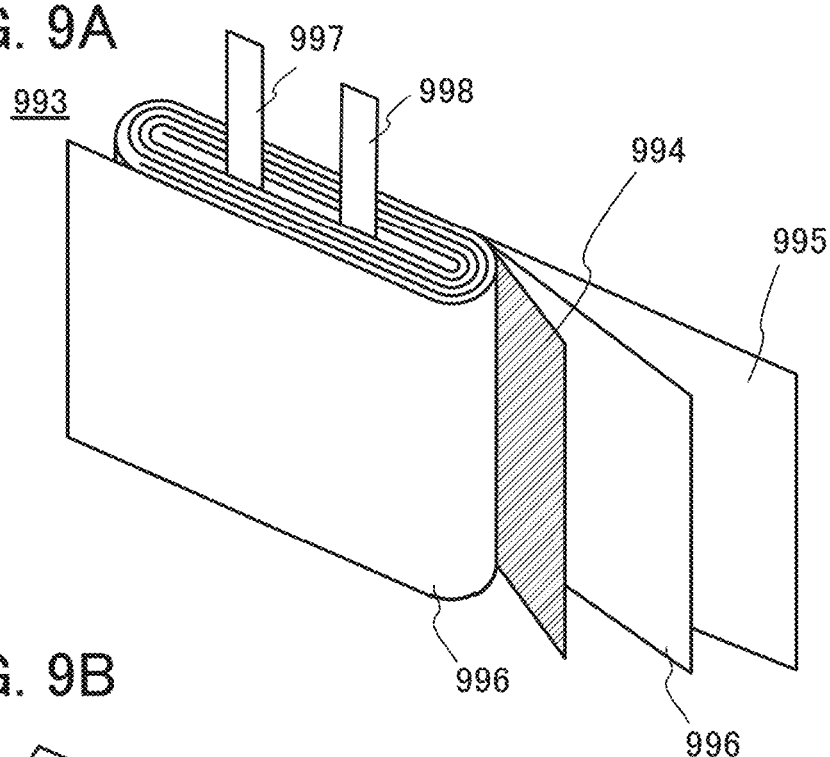
FIG. 9B
FIG. 9C
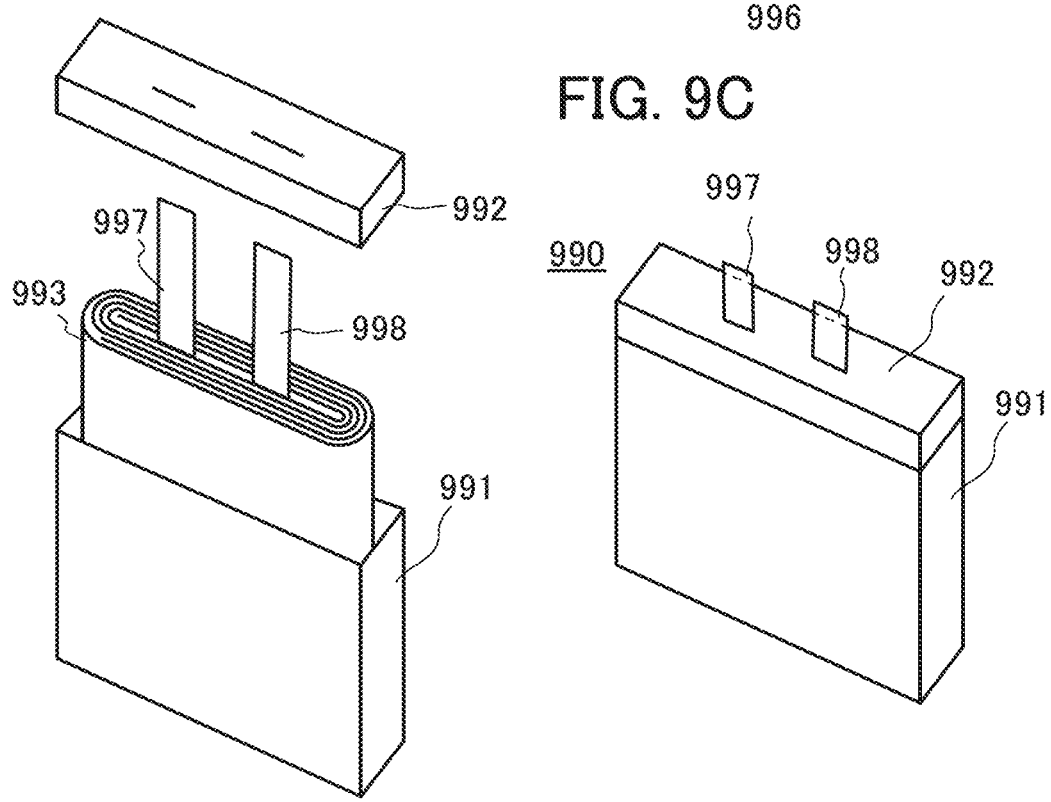

FIG. 11A1
FIG. 11A2
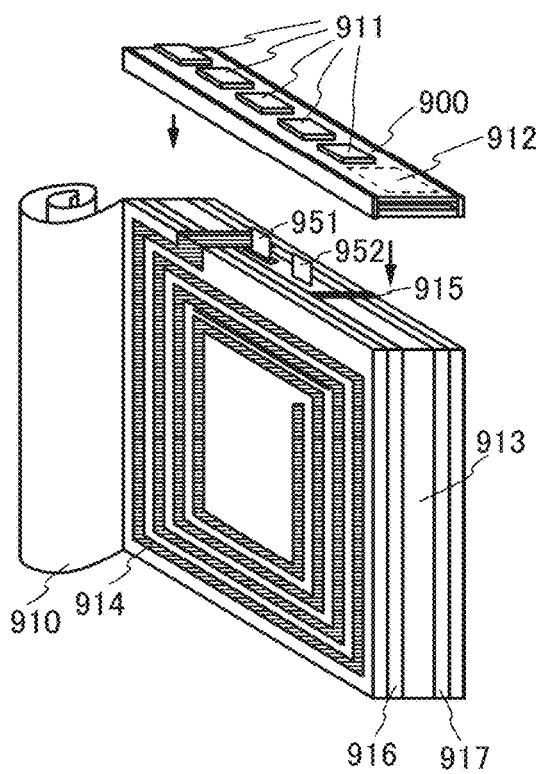
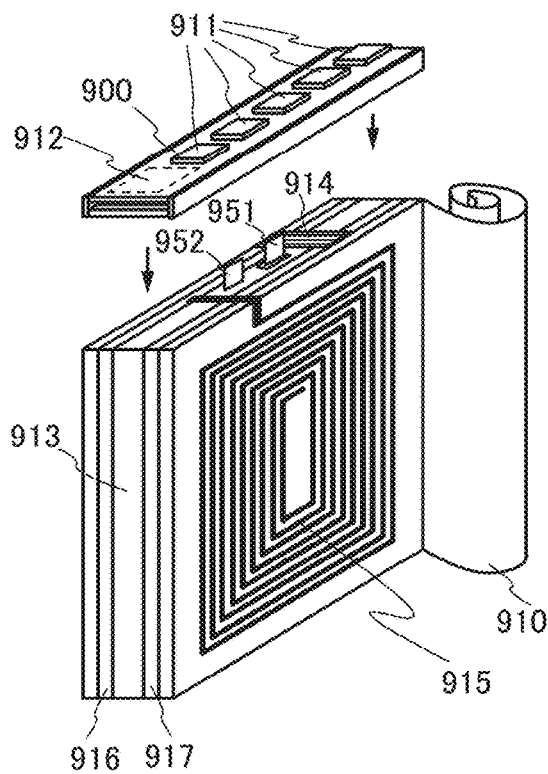
FIG. 11B1
FIG. 11B2
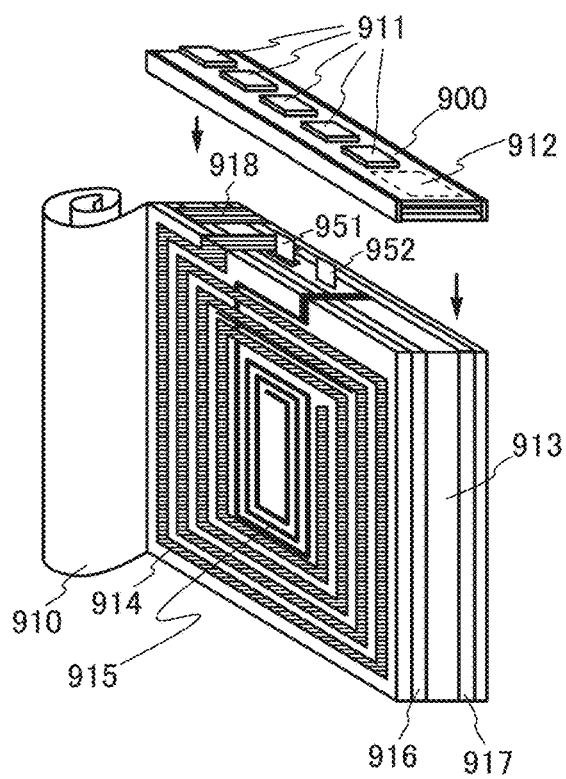
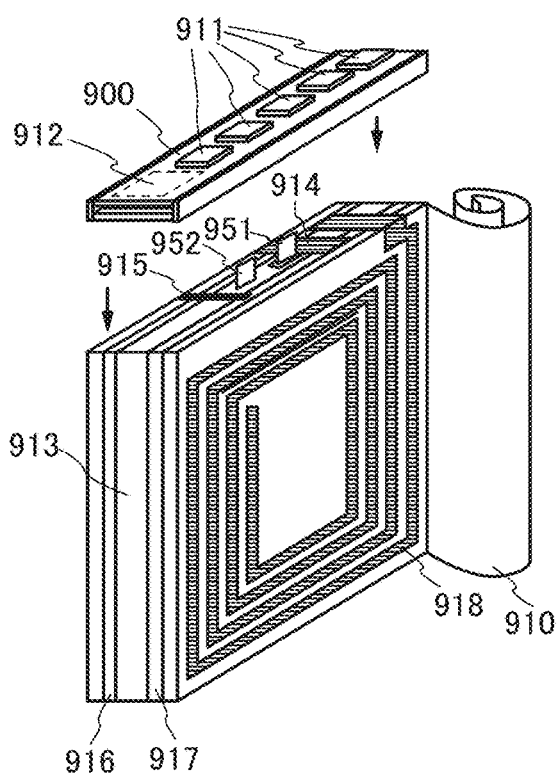

ELECTRODE, POWER STORAGE DEVICE, ELECTRONIC DEVICE, AND MANUFACTURING METHOD OF ELECTRODE

BACKGROUND OF THE INVENTION

1. Field of the Invention

Embodiments of the present invention relate to an electrode, a power storage device, an electronic device, and a method for fabricating the electrode.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a storage device, a method for driving any of them, and a method for manufacturing any of them.

2. Background Art

In recent years, a variety of power storage devices, for example, nonaqueous secondary batteries such as lithium-ion batteries (LIBs), lithium-ion capacitors (LICs), and air cells have been actively developed. In particular, demand for lithium-ion batteries with high output and high energy density has rapidly grown with the development of the semiconductor industry, for electronic devices, for example, portable information terminals such as cell phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion batteries are essential as rechargeable energy supply sources for today's information society.

A negative electrode for power storage devices such as lithium-ion batteries and lithium-ion capacitors is a structure body including at least a current collector (hereinafter referred to as a negative electrode current collector) and an active material layer (hereinafter referred to as a negative electrode active material layer) provided over a surface of the negative electrode current collector. The negative electrode active material layer contains an active material (hereinafter referred to as a negative electrode active material) which can receive and release lithium ions serving as carrier ions, such as carbon or silicon.

At present, to form a negative electrode of a lithium-ion battery which contains a general graphite-based carbon material, for example, graphite, acetylene black (AB), and polyvinylidene fluoride (PVdF) are used as a negative electrode active material, a conductive additive, and a binder, respectively. These materials are mixed with a solvent to make a paste. The paste is applied to a current collector and then the solvent is evaporated. In this manner, the negative electrode is made.

It is known that such a negative electrode of a lithium-ion battery and a lithium-ion capacitor has an extremely low electrode potential and a high reducing ability, and thus an electrolytic solution using an organic solvent is reductively decomposed. The range of potentials in which the electrolysis of an electrolytic solution does not occur is referred to as a potential window. The negative electrode potentials of a lithium-ion battery and a lithium-ion capacitor are out of the potential windows of an electrolytic solution in many cases. Therefore, the electrolytic solution is reductively decomposed, and a decomposition product called a passivating film (also referred to as a solid electrolyte film) is formed on the surface of the negative electrode. The passivating film prevents further reductive decomposition of the electrolytic solution; therefore, lithium ions can be inserted into the negative electrode with the use of a low electrode potential below the potential window of the electrolytic solution (for example, see Non-Patent Document 1).

Patent Document 1 discloses a charging method for a lithium-ion battery by which a passivating film on a negative electrode is prevented from being damaged and the negative electrode and the battery are inhibited from deteriorating.

REFERENCE

Patent Document

[Patent Document] Japanese Published Patent Application No. 2013-149609

Non-Patent Document

[Non-Patent Document 1] Zempachi Ogumi, "Lithium Secondary Battery", Ohmsha, Ltd., the first impression of the first edition published on Mar. 20, 2008, pp. 116-118

SUMMARY OF THE INVENTION

A passivating film is a reductive decomposition product of a reductive decomposition reaction of an electrolytic solution or a product of a reaction between a reductive decomposition product and an electrolytic solution. For example, in the case where a negative electrode active material is graphite with a layered structure, a passivating film is formed between layers in an edge surface of the graphite and on a surface (basal surface) of the graphite.

However, when carrier ions are intercalated into the graphite and thus the volume of the graphite increases, part of the passivating film is separated from the edge surface or surface of the graphite and part of the graphite is exposed in some cases.

In addition, the thickness of the passivating film gradually increases by repeated charge and discharge. The passivating film having an increased thickness is susceptible to the volume expansion of a negative electrode active material, and part of the passivating film is easily separated.

When a surface of the negative electrode active material is exposed by the separation of the passivating film, another passivating film is formed on the surface.

A passivating film of a negative electrode is formed by a battery reaction in charging, and electric charge used for formation of the passivating film cannot be released. Thus, the passivating film results in irreversible capacity, reducing the discharge capacity of a battery.

In addition, separation of the passivating film from the negative electrode active material and formation of other passivating films on the surface of the negative electrode active material from which the previous passivating film has been separated by repeated charge and discharge further reduce the discharge capacity of the battery.

For example, the amount of lithium ions that are carriers is decreased in accordance with the number of electrons used in the electrochemical decomposition reaction of an electrolytic solution in a lithium-ion battery. Therefore, repeated generation of passivating films by charge and discharge of the lithium-ion battery, the capacity of the lithium-ion battery is decreased. In addition, the higher the temperature is, the faster the electrochemical reaction such as reductive decomposition of the passivating film proceeds. Thus, the capacity of the lithium-ion battery decreases more easily when charge and discharge are repeated at high temperatures.

When the negative electrode is soaked in the electrolytic solution, a binder that is part of a negative electrode active material layer absorbs a liquid ingredient and is expanded or deformed in some cases. If adhesion between the negative electrode material and the binder is weak, a material in the active material layer is separated due to expansion or deformation of the binder, which leads to decrease of electric conductivity in the active material layer. This also makes it easier to decrease the capacity of the lithium-ion battery.

Not only lithium-ion secondary batteries but also other power storage devices such as lithium-ion capacitors have the above problems.

An object of one embodiment of the present invention is to provide an active material with a film having an excellent insulating property. Another object is to make it difficult to form a passivating film by inhibiting the electrochemical decomposition of an electrolytic solution on an electrode as much as possible. Another object is to inhibit decrease of the initial discharge capacity of a power storage device.

Another object of one embodiment of the present invention is to provide an active material with a film having high flexibility and high adhesion to the active material. Another object is to inhibit separation of the film and generation of another passivating film in an electrode. Another object of one embodiment of the present invention is to provide a film that increases adhesion between an active material and a binder. Another object is to prevent decrease of electric conductivity in an active material layer due to expansion or the like of an active material or a binder. Another object is to improve the long-term cycle performance of a power storage device.

Another object of one embodiment of the present invention is to provide an active material with a film having high heat resistance. Another object is to inhibit a reductive decomposition reaction of an electrolytic solution at high temperatures. Another object is to provide a power storage device where discharge capacity is less likely to be decreased even when charge and discharge are repeated at high temperatures.

Another object of one embodiment of the present invention is to provide a formation method by which a uniform thin film is efficiently formed on a surface of an active material. Another object of one embodiment of the present invention is to provide a manufacturing method for an electrode where the decomposition reaction of an electrolytic solution is inhibited as much as possible and a passivating film is less likely to be formed. Another object of one embodiment of the present invention is to provide a manufacturing method for an electrode where expansion of an active material and deterioration due to use at high temperatures are inhibited.

Another object of one embodiment of the present invention is to provide a novel electrode, a novel power storage device, or the like. Note that the descriptions of these objects do not disturb the existence of other objects. Note that one embodiment of the present invention does not necessarily achieve all the objects. Objects other than the above objects will be apparent from and can be derived from the descriptions of the specification, the drawings, the claims, and the like.

One embodiment of the present invention is an electrode including a current collector and an active material layer. The active material layer includes an active material, a film including silicone, a conductive additive, and a binder. The active material is in the form of particles. The film including silicone covers at least part of the active material.

One embodiment of the present invention is a power storage device including a first electrode and a second electrode. The first electrode is configured to operate as one of a positive electrode and a negative electrode. The second electrode is configured to operate as the other of the positive electrode and the negative electrode. The first electrode includes a current collector and an active material layer. The active material layer includes an active material, a film including silicone, a conductive additive, and a binder. The active material is in the form of particles. The film including silicone covers at least part of the active material.

One embodiment of the present invention is an electronic device including the power storage device with the above structure and a display panel, a light source, an operation key, a speaker, or a microphone.

One embodiment of the present invention is a manufacturing method for an electrode including the following steps: a step of forming a mixed liquid of an active material, silicone, and a first solvent; a step of spraying the mixed liquid from a nozzle and evaporating the first solvent to form an active material with a film thereon; a step of forming a paste including the active material with the film thereon, a conductive additive, a binder, and a second solvent; and a step of applying the paste to a current collector and evaporating the second solvent to form an active material layer.

One embodiment of the present invention is a manufacturing method for an electrode including the following steps: a step of forming a mixed liquid of an active material, silicone, a conductive additive, and a first solvent; a step of spraying the mixed liquid and evaporating the first solvent with a spray dryer to form a mixture with a film thereon; a step of forming a paste including the mixture with the film thereon, a binder, and a second solvent; and a step of applying the paste to a current collector and evaporating the second solvent to form an active material layer.

In any of the above structures, the active material preferably includes at least one of graphite, silicon, and silicon monoxide. In any of the above structures, the silicone preferably includes a hydrophobic functional group. In any of the above structure, the silicone preferably includes a hydrophobic functional group including at least one of a phenyl group, an alkyl group, an alkoxy group, a carbonyl group, and an ester group. In any of the above structure, the silicone preferably includes a hydrophilic functional group.

One embodiment of the present invention can provide an active material with a film having a high insulating property. In addition, one embodiment of the present invention makes it difficult to form a passivating film by inhibiting the electrochemical decomposition of an electrolytic solution in an electrode as much as possible. The above effects can inhibit decrease of initial discharge capacity of a power storage device.

One embodiment of the present invention can provide an active material with a film that has high flexibility and high adhesion to the active material. Separation of the film and regeneration of a passivating film in an electrode can be suppressed. One embodiment of the present invention can provide a film that increases adhesion between an active material and a binder. An electron conduction path can be prevented from being blocked in an active material layer due to expansion or the like of an active material or a binder because the film functions as a binder. The above effects can improve long-term cycle performance of a power storage device.

One embodiment of the present invention can provide an active material coated with a film having high heat resistance. This can inhibit a reductive decomposition reaction of an electrolytic solution at high temperatures. Because of achievement of the above objects, a power storage device where discharge capacity is less likely to be decreased even when charge and discharge are repeated at high temperatures can be provided.

One embodiment of the present invention can provide a formation method by which a uniform thin film is efficiently formed on a surface of an active material. One embodiment of the present invention can provide a manufacturing method for an electrode where a decomposition reaction of an electrolytic solution is inhibited as much as possible and a passivating film is less likely to be formed. One embodiment of the present invention can provide a manufacturing method for an electrode where expansion of an active material or deterioration due to use at high temperatures are inhibited.

One embodiment of the present invention can provide a novel electrode, a novel power storage device, or the like. Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

FIG. 4 illustrates a thin storage battery.
FIGS. 9A to 9C illustrate a power storage device.
FIGS. 11A1, 11A2, 11B1, and 11B2 each illustrate a power storage device.

DETAILED DESCRIPTION OF THE INVENTION

Figure 1A:
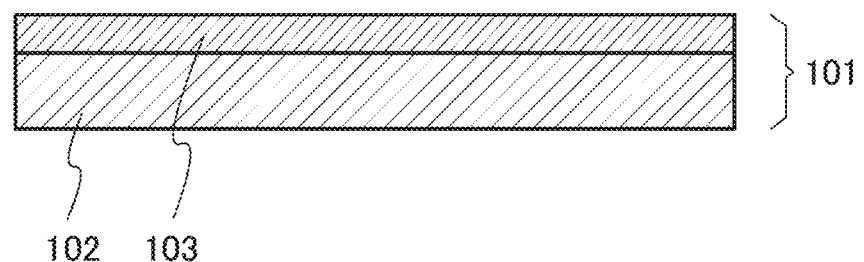
FIGS. 1A and 1B illustrate an electrode and an active material layer.

Hereinafter, embodiments and examples of the present invention will be described in detail with reference to the accompanying drawings. However, the embodiments and examples can be implemented with various modes. It will be readily appreciated by those skilled in the art that modes and details can be changed in various ways without departing from the spirit and scope of the present invention. Accordingly, the present invention should not be interpreted as being limited to the description of the embodiments and examples below.

Note that in drawings used in this specification, the thicknesses of films, layers, and substrates and the sizes of components (e.g., the sizes of regions) are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as an electrode; in that case, the electrode refers to at least one of the positive electrode and the negative electrode for the power storage device.

Embodiment 1

In this embodiment, an electrode of one embodiment of the present invention will be described with reference to FIGS. 1A and 1B.

Figure 1B:
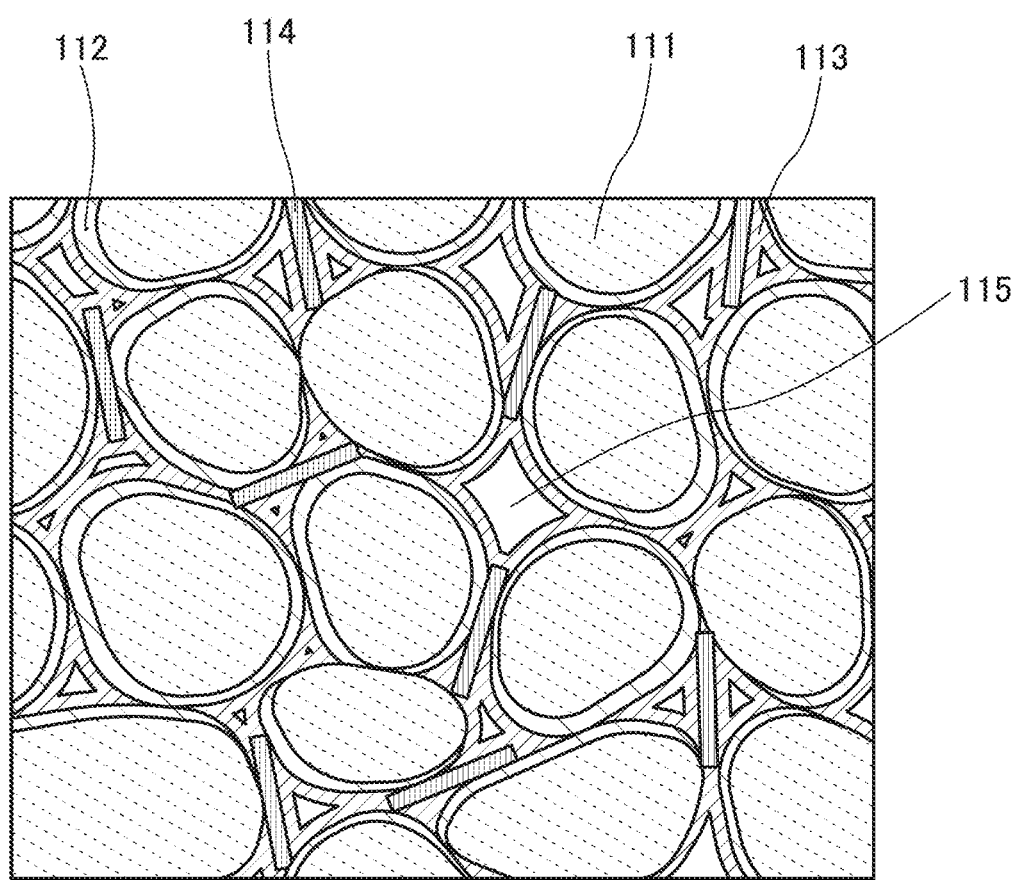

FIGS. 1A and 1B illustrate an electrode of one embodiment of the present invention. FIG. 1A is a cross-sectional view of an electrode 101. In the schematic view of FIG. 1A, an active material layer 103 is formed over one surface of the current collector 102. Note that active material layers 103 may be provided so that the current collector 102 is sandwiched therebetween.

FIG. 1B is an enlarged schematic view of a cross section of the active material layer 103. FIG. 1B shows active materials in the form of particles as the active material particles 111 and fiber-like or needle-like conductive materials as conductive additives 114. There is no specific limitation on the diameter of the active material particle 111. When the active material particles 111 are negative electrode active material particles, the diameter thereof can be, for example, greater than or equal to 5 nm and less than or equal to 50 μm. In the case where the active material particles 111 are positive electrode active material particles used for a positive electrode and each of the positive electrode active material particles is a secondary particle, the diameter of primary particles composing the secondary particle can be in the range from 5 nm to 10 μm.

The surface of the active material particle 111 has a region in contact with another active material particle. The surface of the active material particle 111 has a region in contact with the conductive additive 114. The surface of the active material particle 111 has a region in contact with a binder 113. The surface of the active material particle 111 except these regions is partly or entirely covered with a film 112. It is preferable that the film 112 cover the entire surface of the active material particle 111 except the above regions; however, the film may be provided to cover only part of the surface of the active material particle 111. The active material particles 111 are bound to each other by the binder 113, in the state of contact with each other, the state where they are adjacent to each other with the conductive additive 114 therebetween, or the state where they are adjacent to each other with the conductive additive 114 and the film 112 therebetween. In some cases, the active material layer 103 includes a space 115 formed by a plurality of the active material particles 111.

A conduction path of electrons formed by the plurality of active material particles 111 in the active material layer 103 will be described. As shown in FIG. 1B, the active material particle 111 has at least one of a region in contact with another active material particle and a region adjacent to another active material particle with the conductive additive therebetween, whereby the conduction path of electrons is formed. In a region where the active material particle 111 is in contact with a thin part of the film 112, the conduction path of electrons is also formed with the conductive additive 114 therebetween. In this way, the entire or part of the surface of the active material particle 111 is covered with the film 112 with the conduction path of electrons formed, which prevents the surface of the active material particle 111 from being in contact with an electrolytic solution and prevents the electrolytic solution from being supplied with electrons in charging of a power storage device. Therefore, the electrochemical decomposition of the electrolytic solution on the electrode of one embodiment of the present invention can be inhibited by the film 112 having a region covering the surface of the active material particle 111. Thus, formation of a passivating film on the active material particle 111 due to the reductive decomposition of the electrolytic solution can be inhibited.

The description of the film that covers or coats something in this specification includes not only the case where the film covers the entire surface of an object but also the case where the film partly covers the surface of an object.

It is preferable that carrier ions can pass through the film 112. Thus, it is preferable that the film 112 be formed using a material through which carrier ions can pass, and be thin enough to allow carrier ions to pass through the film. When the film 112 has a thickness of for example, greater than or equal to 0.1 nm and less than or equal to 1 m, preferably greater than or equal to 0.1 nm and less than or equal to 50 nm, more preferably greater than or equal to 0.1 nm and less than or equal to 5 nm, a decomposition reaction between the active material particle 111 and the electrolytic solution can be inhibited.

The film 112 includes silicone. Alternatively, the film 112 preferably includes silicone as a main component. Note that in some cases, a "main component" refers to a material estimated from elements or ions detected by energy dispersive X-ray spectrometry (EDX), X-ray photoelectron spectroscopy (XPS), time-of-flight secondary ion mass spectrometry (ToF-SIMS), or the like.

Silicone has an excellent insulating property; therefore, forming the film 112 including silicone on the surface of the active material particle 111 can prevent as much electrochemical decomposition of the electrolytic solution as possible on the electrode 101. Therefore, the use of the electrode of one embodiment of the present invention can inhibit formation of a passivating film, whereby decrease of discharge capacity of a power storage device can be inhibited.

In the case of using, as the active material particle 111, an active material particle whose volume is changed by charge and discharge, the film 112 is preferably changed in shape accordingly when the active material particle 111 is changed in shape because of the change in volume thereof. When the film 112 is separated from the active material particle 111, a passivating film is generated in some cases. Silicone contained in the film 112 of one embodiment of the present invention has high flexibility. Therefore, the film 112 can be changed in shape in accordance with the change of the active material particle 111 in shape due to the change thereof in volume, whereby separation of the film 112 from the active material particle 111 can be inhibited.

Silicon has an organic functional group. Adhesion between an active material and silicone can be increased by selection of silicone including a hydrophilic group or a hydrophobic group as the organic functional group depending on the used active material. For example, high affinity can be obtained with a carbon-based material by hydrophobic interaction. When a carbon-based material, such as graphite, or a material containing a large amount of silicon, such as silicon (Si) or silicon monoxide (SiO), is used for the active material particle 111, silicone with a hydrophobic functional group is preferably used because adhesion between the active material particle 111 and the film 112 containing the silicone can be increased.

In this specification and the like, silicone means an oligomer or a polymer formed from dehydration condensation of silanol ($R_3Si$—OH, and R means H or an organic functional group).

For example, silicone may be a silicone resin, a silicone oil, silicone rubber, a silicone gel, or a silicone grease, or may be a mixture of two or more kinds of silicone. Silicone may have a straight-chain structure, a circular structure, or a branched structure. Silicone may include an organic functional group at one or both of a side chain and a terminal.

Silicone may include, for example, an alkyl group with 10 or less carbon atoms, such as a methyl group or an ethyl group, an aryl group, such as a phenyl group or a benzyl group, or an alkoxy group, such as a methoxy group, an ethoxy group, or a phynoxy group. Alternatively, silicone may include a carbonyl group having an alkyl group with 10 or less carbon atoms, or an ester group with 10 or less carbon atoms, such as a methyl ester group or an ethyl ester group. Silicone preferably includes, for example, a hydrophobic functional group such as a phenyl group or an alkyl group, in which case adhesion to the active material particle 111 can be increased by a hydrophobic interaction. Alternatively, silicone preferably includes a hydrophilic group such as a hydroxyl group, a carboxyl group, a sulfo group, or an amino group, in which case adhesion to the active material particle 111 can be increased by a hydrophilic interaction.

The film 112 including silicone can be changed in shape in accordance with the change of the active material particle 111 in volume, which can prevent the film 112 from being separated from the active material particle 111. Furthermore, even in the case where a passivating film is formed, increase in the thickness of the passivating film by repeated charge and discharge is inhibited, whereby the passivating film is less likely to be influenced by volume expansion of the active material particle, and separation of the passivating film from the active material particle can be inhibited. Therefore, the use of the electrode of this embodiment can inhibit regeneration of a passivating film, and improve the long-term cycle performance of a power storage device.

The film 112 including silicone has excellent heat resistance. Thus, a reductive decomposition reaction of an electrolytic solution that is promoted at high temperatures can be inhibited. Therefore, in a power storage device with the electrode of this embodiment, discharge capacity is less likely to decrease even when charge and discharge are repeated at high temperatures.

The film 112 including silicone has high adhesion to a binder containing carboxymethyl cellulose (CMC), styrene-butadiene rubber (SBR), or the like. Therefore, even when an expansion of the active material particle or the binder occurs in the electrode, the binder is less likely to be separated from the active material particle. Therefore, separation of materials in the electrode, which leads to a decrease of electric conductivity, can be prevented. Thus, the use of the electrode of this embodiment can improve the cycle performance of a power storage device.

A binder that can be contained in the active material layer 103 will be described below.

As the binder, water-soluble polymer can be used. As the water-soluble polymer, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

Here, a water-soluble polymer can be dissolved in water and thus can be used to adjust and stabilize the viscosity of a paste when the paste for making the electrode is formed with the use of water as a solvent. Furthermore, the use of a water-soluble polymer allows formation of a paste in which other materials (e.g., the active material, the binder, and the conductive additive) are more uniformly mixed. The paste is applied to a current collector and then dried, so that the electrode where the active material layer is in contact with the current collector is obtained. Note that "something can be dissolved in water" means that a functional group of a polymer is ionized in water, for example, here.

Here, a water-soluble polymer does not necessarily dissolve only in water, and may dissolve in a solvent other than water. For example, a polymer is dissolved in a polar solvent other than water and an active material and other materials are dispersed in the mixture to form the paste. Alternatively, polymers that dissolves only in a solvent other than water may be used.

As the binder, a rubber material such as styrene-butadiene rubber (SBR), styrene-isoprene-styrene rubber, acrylonitrile-butadiene rubber, butadiene rubber, or ethylene-propylene-diene copolymer is preferably used. Any of these rubber materials is more preferably used in combination with the aforementioned water-soluble polymers. Since these rubber materials have rubber elasticity and easily expand and contract, it is possible to obtain a highly reliable electrode that is resistant to stress due to expansion and contraction of an active material by charge and discharge, bending of the electrode, or the like. On the other hand, the rubber materials have a hydrophobic group and thus are unlikely to be soluble in water in some cases. In such a case, particles are dispersed in an aqueous solution without being dissolved in water, and increasing the viscosity of the paste up to the viscosity suitable for application to the current collector might be difficult. A water-soluble polymer having an excellent function of adjusting viscosity, such as a polysaccharide, can moderately increase the viscosity of the solution and can be uniformly dispersed together with a rubber material. Thus, a favorable electrode with high uniformity (e.g., an electrode with uniform electrode thickness or electrode resistance) can be obtained.

As the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon. PVdF, or polyacrylonitrile (PAN) can be used.

A single binder may be used or plural kinds of binders may be used in combination.

For example, a binder having high adhesion or high elasticity and a binder having a significant viscosity modifying effect may be used in combination. As the binder having a significant viscosity modifying effect, for example, a water-soluble polymer is preferably used. An example of a water-soluble polymer having an especially significant viscosity modifying effect is the above-mentioned polysaccharide; for example, a cellulose derivative such as CMC, methyl cellulose, ethyl cellulose, hydroxypropyl cellulose, diacetyl cellulose, or regenerated cellulose, or starch can be used.

Note that a cellulose derivative such as CMC obtains a higher solubility when converted into a salt such as a sodium salt (CMC-Na) or an ammonium salt of carboxymethyl cellulose, and accordingly, easily exerts an effect as a viscosity modifier. The high solubility can also increase the dispersibility of an active material and other components in the formation of the paste for an electrode. In this specification, cellulose and a cellulose derivative used as a binder of an electrode include salts thereof.

The water-soluble polymer stabilizes viscosity by being dissolved in water and allow stable dispersion of the active material and a second binder such as SBR in an aqueous solution. Furthermore, a water-soluble polymer is expected to be easily and stably adsorbed to an active material surface because it has a functional group. Many cellulose derivatives such as CMC have functional groups such as a hydroxyl group and a carboxyl group. Because of functional groups, polymers are expected to interact with each other and cover an active material surface in a large area.

There is no particular limitation on the current collector 102 as long as it has high conductivity without causing a significant chemical change in a power storage device. For example, the current collector 102 can be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like can be used to form the current collector 102. Alternatively, the current collector 102 can be formed using an aluminum alloy to which an element that improves heat resistance, such as silicon, neodymium, scandium, or molybdenum, is added. The current collector 102 can have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The current collector 102 may be formed to have micro irregularities on the surface thereof in order to enhance adhesion to the active material layer, for example. The current collector 102 preferably has a thickness of 5 µm to 30 µm inclusive.

The positive electrode active material layer 103 includes the active material. An active material refers only to a material that relates to insertion and extraction of ions that carriers. In this specification and the like, a material that is actually an "active material" and the material including a conductive additive, a binder, and the like are collectively referred to as an active material layer.

In the case where the active material is a negative electrode active material, a carbon-based material, an alloy-based material, or the like that enables charge and discharge reactions by an alloying reaction and a dealloying reaction with lithium can be used.

Examples of the carbon-based material include graphite, graphitizing carbon (soft carbon), non-graphitizing carbon (hard carbon), a carbon nanotube, graphene, and carbon black.

Examples of graphite include artificial graphite such as meso-carbon microbeads (MCMB), coke-based artificial graphite, and pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion battery can have a high operating voltage. In addition, graphite is preferred because of its advantages such as relatively high capacity per unit volume, small volume expansion, low cost, and higher level of safety than that of a lithium metal.

For the negative electrode active material, an alloy-based material can be used. In the case where carrier ions are lithium ions, a material containing at least one of Al, Si, Ge, Sn, Pb, Sb, Bi, Ag, Au, Zn, Cd, In, Ga, and the like can be used as the alloy-based material, for example. Such elements have higher capacity than carbon. In particular, silicon has a significantly high theoretical capacity of 4200 mAh/g. For this reason, silicon is preferably used as the negative electrode active material. Examples of the material using any of such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Note that SiO refers to the powder of a silicon oxide including a portion with a high silicon content and can also be referred to as $SiO_y$ (0<y<2). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, for the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The above carbon materials can each function as an active material and a conductive additive of a negative electrode. Thus, the active material layer 103 may include one or more of the above carbon materials. The carbon material can also function as a conductive additive of a positive electrode. Note that as the conductive additive, a carbon material with a large specific surface area is preferably used. The use of a carbon material with a large specific surface area as the conductive additive can increase contact points and the contact area of active materials.

In the case where the electrode 101 is a positive electrode, a material into and from which lithium ions can be intercalated and deintercalated can be used; for example, a material having an olivine crystal structure, a layered rock-salt crystal structure, a spinel crystal structure, or a NASICON crystal structure, or the like can be used.

As the positive electrode active material, a compound such as $LiFeO_2$, $LiCoO_2$, $LiNiO_2$, or $LiMn_2O_4$, $V_2O_5$, $Cr_2O_5$, or $MnO_2$ can be used.

Alternatively, lithium-containing complex phosphate ($LiMPO_4$ (general formula) (M is one or more of Fe(II), Mn(II), Co(II), and Ni(II))) can be used. Typical examples are lithium metal phosphate compounds such as $LiFePO_4$, $LiNiPO_4$, $LiCoPO_4$, $LiMnPO_4$, $LiFe_aNi_bPO_4$, $LiFe_a$-$Co_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_c$-$Ni_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, lithium-containing complex silicate such as $Li_{(2-j)}MSiO_4$ (general formula) (M is one or more of Fe(II), Mn(II), Co(II), and Ni(II); j is a natural number of 0 to 2) may be used. Typical examples are lithium silicate compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mN$-$i_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the NASICON compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $FeF_3$, a metal chalcogenide (a sulfide, a selenide, or a telluride) such as $TiS_2$ and $MoS_2$, a material with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

A lithium-manganese composite oxide that is represented by a composition formula $Li_xMn_yM_zO_w$ can be used as the positive electrode active material. Here, the element M is preferably silicon, phosphorus, or a metal element other than lithium and manganese. In addition, $x/(y+z)$ is preferably larger than or equal to 0 and smaller than 2, z is larger than 0, and $(y+z)/w$ is preferably larger than or equal to 0.26 and smaller than 0.5. Note that the lithium-manganese composite oxide is an oxide containing at least lithium and manganese, and may contain at least one selected from a group consisting of chromium, cobalt, aluminum, nickel, iron, magnesium, molybdenum, zinc, indium, gallium, copper, titanium, niobium, silicon, phosphorus, and the like. The lithium-manganese composite oxide preferably has a layered rock-salt crystal structure. The lithium-manganese composite oxide may have a layered rock-salt crystal structure and a spinel crystal structure. The average particle diameter of the lithium-manganese composite oxides is preferably greater than or equal to 5 nm and less than or equal to 50 µm, for example.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

The particle size of the positive electrode active material is preferably, for example, greater than or equal to 5 nm and less than or equal to 100 µm.

For example, lithium-containing complex phosphate having an olivine crystal structure used for the positive electrode active material has a one-dimensional lithium diffusion path, so that lithium diffusion is slow. The particle size of the active material is thus preferably, for example, greater than or equal to 5 nm and less than or equal to 1 µm. The specific surface area of the active material is preferably, for example, greater than or equal to 10 $m^2/g$ and less than or equal to 50 $m^2/g$.

A positive electrode active material having an olivine crystal structure is much less likely to be changed in the crystal structure by charge and discharge and has a more stable crystal structure than, for example, an active material having a layered rock-salt crystal structure. Thus, a positive electrode active material having an olivine crystal structure is stable toward operation such as overcharge. The use of such a positive electrode active material allows fabrication of a highly safe power storage device.

The active material layer 103 may include a conductive additive. For example, a carbon material or a carbon fiber such as natural graphite, artificial graphite (e.g., mesocarbon microbeads), or graphene can be used. Alternatively, metal powder or metal fiber of copper, nickel, aluminum, silver, gold, or the like, a conductive ceramic material, or the like can be used.

As the conductive additive, a material having a flake-like shape, a needle-like shape, or a fiber-like shape can be used. Flaky graphene has an excellent electrical characteristics of high conductivity and excellent physical properties of high flexibility and high mechanical strength. For this reason, the use of graphene as the conductive additive can increase the points and the area where the active materials are in contact with each other.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in graphene. When graphene contains oxygen, the proportion of oxygen, which is measured by X-ray photoelectron spectroscopy (XPS), is higher than or equal to 2 at. % and lower than or equal to 20 at. %, preferably higher than or equal to 3 at. % and lower than or equal to 15 at. %.

Examples of carbon fiber include mesophase pitch-based carbon fiber, isotropic pitch-based carbon fiber, carbon nanofiber, carbon nanotube, and vapor-grown carbon fiber (VGCF, registered trademark). The representative values of VGCF (registered trademark) are as follows: the fiber diameter is 150 nm; the fiber length is 10 µm to 20 µm, inclusive; the real density is 2 $g/cm^3$; and the specific surface area is 13 $m^2/g$. Note that when a cross section perpendicular to a fiber axis is regarded as a cutting plane in a two-dimensional SEM image, the fiber diameter is a diameter of a perfect circle that circumscribes the cutting plane. The real density is a density calculated using a volume occupied by a substance itself. The specific surface area is the surface area of an object per unit mass or per unit volume.

In addition, VGCF (registered trademark), which has a needle-like shape, has an excellent electrical characteristic of high conductivity and an excellent physical property of high mechanical strength. Thus, the use of VGCF (registered trademark) as the conductive additive can increase contact points and the contact area of active materials.

Alternatively, a particle-like material can be used for the conductive additive. A typical example of the particle-like material is carbon black, such as acetylene black or ketjen black (registered trademark), whose diameter is 3 nm to 500 nm, inclusive.

The conductive additive with a flake-like shape, a needle-like shape, or a fiber-like shape has a function of binding the active materials and inhibits deterioration of a battery. The conductive additive including any one of the above shapes also functions as a structure body or cushioning for maintaining the shape of the active material layer 103. Thus, separation between the current collector and the active materials is less likely to occur even when a secondary battery is changed in its form by being bent or by repeated expansion and contraction of the active materials. Although carbon black such as acetylene black or ketjen black (registered trademark) may be used instead of the material, VGCF (registered trademark) is preferably used because the strength for keeping the shape of the active material layer 103 can be increased. When the strength for keeping the shape of the active material layer 103 is high, deterioration of the secondary battery caused by changes in its form (e.g., bending) can be prevented.

As described above, the electrode of one embodiment of the present invention includes the film 112 including silicone, thereby inhibiting the electrochemical decomposition of an electrolytic solution on the electrode as much as possible and inhibiting formation of a passivating film. In addition, formation of a passivating film at high temperatures can be inhibited. Even when a passivating film is formed, separation of the passivating film or generation of another passivating film can be inhibited.

The use of the electrode for a power storage device such as a lithium-ion battery and a lithium-ion capacitor can inhibit decrease of initial discharge capacity. Furthermore, it is possible to improve the long-term cycle performance of the power storage device. In addition, a power storage device whose discharge capacity is less likely to decrease even when charge and discharge are repeated at high temperatures can be obtained.

In this embodiment 1, one embodiment of the present invention has been described. Other embodiments of the present invention will be described in Embodiments 2 to 6. Note that one embodiment of the present invention is not limited to the above. In other words, various embodiments of the invention are described in this embodiment and the other embodiments, and one embodiment of the present invention is not limited to a particular embodiment. Although an example of application to a lithium-ion secondary battery is described in this embodiment, one embodiment of the present invention is not limited to this example. Application of one embodiment of the present invention to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible depending on circumstances. Application to a primary battery, a capacitor, and a lithium-ion capacitor is also possible. Although the example where the film 112 includes silicone is described in this embodiment, one embodiment of the present invention is not limited thereto. Depending on circumstances or conditions, the film 112 of one embodiment of the present invention may include any of a variety of materials or does not necessarily include silicone.

This embodiment can be implemented in combination with any of the other embodiments as appropriate.

Embodiment 2

In this embodiment, an example of a fabricating method for an electrode will be described with reference to FIGS. 2A and 2B. A film is formed on the surface of an active material using a spray dryer in this embodiment.

The spray dryer is an apparatus that allows an undiluted solution such as a solution or a suspension liquid to turn into solid particles in a moment with a hot air. FIG. 2A is a schematic view of the spray dryer. First, an undiluted solution is sprayed from a two-fluid nozzle 121 with a hot air blown from a heating means 122. In a spray cylinder 123, as soon as the undiluted solution is sprayed, a solvent contained in the undiluted solution is evaporated; thus, solid particles are obtained. Then, the particles are separated by a cyclone 124, and the solid particles are collected in a container 125. An air filter 126 removes fine particles from a gas, and an evacuation unit 127 makes the flow of a gas. Note that arrows in FIG. 2A indicate the flow of a dry gas.

(Fabricating Method 1)

Figure 2A:
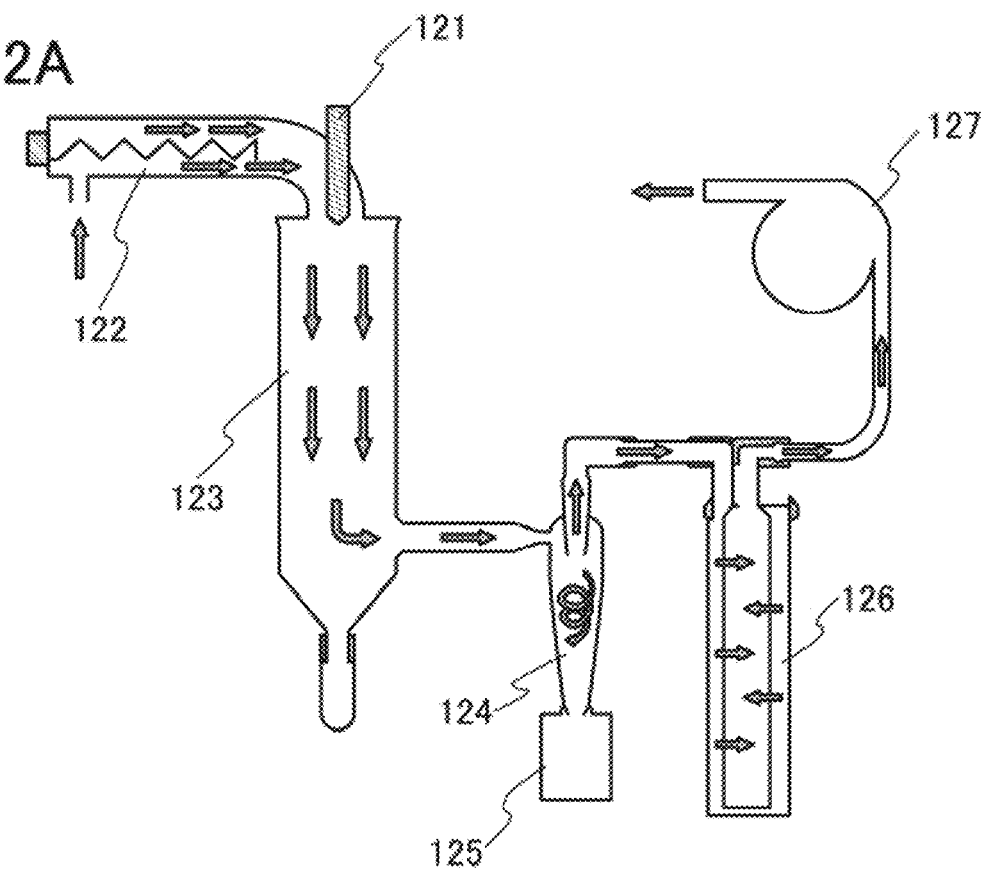
FIGS. 2A and 2B are a diagram of a spray dryer and a manufacturing flow of an electrode.
Figure 2B:
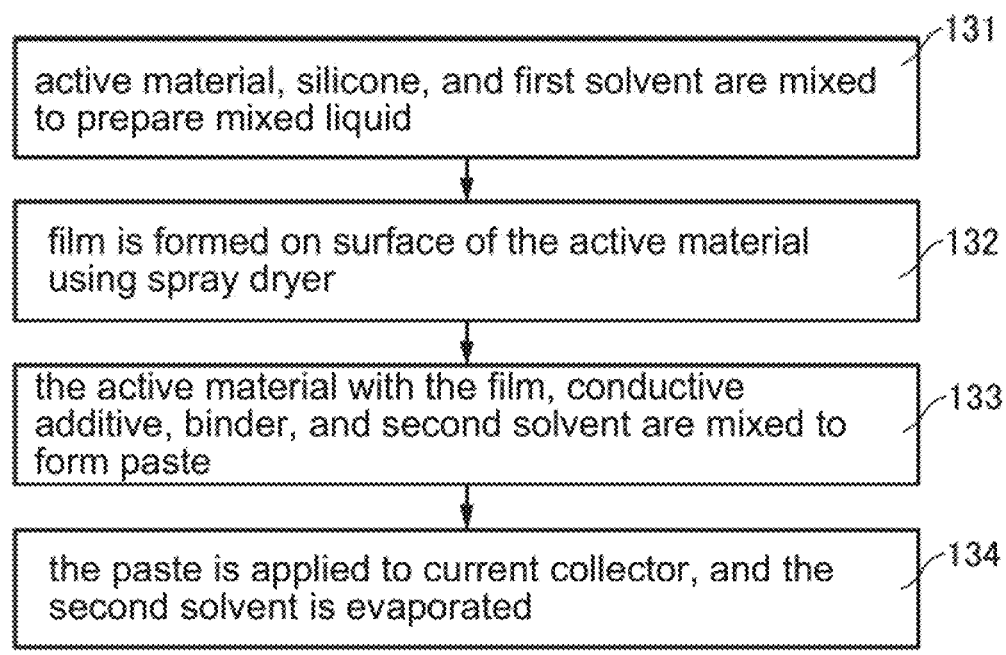

FIG. 2B shows a fabrication flow of an electrode.

First, an active material, silicone, and a solvent (also referred to as a first solvent) are mixed to prepare a mixed liquid (Step 131). For the active material, any of the materials given as examples of the active material in Embodiment 1 can be used. For silicone, any of the materials given as example of silicone in Embodiment 1 can be used.

The form of silicone is not particularly limited and may be a solid form, a liquid form, a powdery form, or a gelled form. In terms of facilitation of a spray-dry step, silicone not containing a solvent is preferably used; however, silicone containing a solvent may be used. Examples of the solvent include isopropyl alcohol, n-butanol, isobutyl alcohol, diacetone alcohol, toluene, xylene, ligroin, benzene, and petroleum ether.

The proportion of silicone to the active material is determined so as to be higher than or equal to 0.1 wt % and lower than or equal to 5 wt %, preferably higher than or equal to 0.1 wt % and lower than or equal to 3 wt %. The value is not the proportion of silicone formed as a film to the active material but the weight ratio of silicone to the active material in formation of the mixed liquid.

As the first solvent, a solvent in which silicone is dissolved with great ease and which has a low boiling point is preferably used. Examples of the first solvent include ethanol, methanol, isopropyl alcohol, 1-propanol, diethyl ether, and tetrahydrofuran (THF). Furthermore, water may be added as an additive.

The first solvent whose amount is large enough to allow silicone to be dissolved therein and reduce the viscosity of the mixed liquid is preferably used. However, using an excessive amount of first solvent reduces the efficiency of the following step with the spray dryer. Thus, the amount of the first solvent used to form the mixed liquid is preferably greater than or equal to 1 times and less than or equal to 50 times the volume of the active material.

Then, the mixed liquid is put in the spray dryer illustrated in FIG. 2A, and sprayed from the two-fluid nozzle 121, and the first solvent is evaporated in a moment in the spray cylinder 123 (Step 132). In the sprayed fine liquid drops, the surface of each active material particle is partly or entirely covered with silicone. When the fine liquid drops are exposed to a gas heated by the heating means 122, the first solvent is evaporated in a moment. For example, the first solvent is evaporated with nitrogen heated to 100° C. by the heating means 122.

The thus obtained active material particles with the films thereon may be subjected to heat treatment. The heat treatment is performed, for example, on a hot plate at a temperature in the range from 40° C. to 300° C. for longer than or equal to 10 minutes and shorter than or equal to 10 hours. Through the heat treatment, the solvent left in the spray drying can be evaporated.

Through the above steps, the active material particles with the films including silicone can be formed. In this embodiment, the use of the spray dryer makes it possible to efficiently form a uniform thin film on the surface of each active material particle.

Subsequently, the active material particles with the films including silicone, a conductive additive, a binder, and a solvent (also referred to as a second solvent) are mixed to form a paste (Step 133).

By the mixing, the active material particles with the films thereon, the conductive additive, and the binder are mixed while being in contact with each other. Consequently, part of the film might be separated, partly exposing the surfaces of the active material particles. In the exposed region, the active material particle might be directly in contact with one or more of another active material particle, the conductive additive, and the binder.

As the conductive additive, any of the materials for the conductive additive described in Embodiment 1 can be used, for example. For the binder, any of the materials described in Embodiment 1 can be used. With the use of a water-soluble polymer as the binder, a paste with an appropriate viscosity for application can be formed. In addition, a paste with high dispersibility can be formed.

As the second solvent, water or a polar solvent can be used. For example, methanol, ethanol, acetone, tetrahydrofuran (THF), dimethylformamide (DMF), N-methylpyrrolidone (NMP), dimethyl sulfoxide (DMSO), or a mixed solution of any two or more of the above can be used. Water is preferably used in terms of the safety and cost.

Here, the example in which CMC and SBR are used as the binder and water is used as the second solvent will be described.

First, the active material particles with the films thereon and the conductive additive are mixed. The mixing is performed with a mixer, for example. At this time, it is preferred that the active material particles with the films thereon, the conductive additive, and a small amount of water be mixed and kneaded (mixed in a high viscosity state), in which case the active material particles with the films thereon and the conductive additive may be easily dispersed uniformly.

Next, CMC is added and mixing is performed using a mixer or the like to obtain a mixture. At this time, a CMC aqueous solution prepared by mixing CMC with water in advance is preferably added, in which case cohesion of CMC may be prevented. When water is added prior to the addition of CMC, the viscosity is lowered, so that the active material particles with the films thereon and the conductive additive cannot be uniformly dispersed in some cases.

After that, water may further be added and mixing may be performed.

Then, SBR is added to the mixture and mixing is performed using a mixer or the like. Here, a mixed liquid in which SBR and water have been mixed is preferably added to the mixture, in which case cohesion of SBR can be suppressed unlike in the case where SBR powder is added. Furthermore, dispersibility of other materials and SBR is improved in some cases.

Next, the pressure of this mixture may be reduced to perform degasification thereof. Through the above steps, a favorable paste in which the active material particles with the films thereon, the conductive additive, CMC, and SBR are uniformly dispersed can be formed.

Note that the order of mixing the active material particles with the films thereon, the conductive additive, CMC, and SBR is not limited to the above. All the materials may be added at a time and mixed.

As an example, another fabricating method will be described. First, the active material particles with the films thereon, the conductive additive, and CMC in the form of powder are mixed in a mixer or the like. Then, water is added in the state where the materials are mixed, and mixing is further performed.

At this time, it is preferable to add a small amount of water and perform mixing (kneading) in a high viscosity state, in which case cohesion of the active material particles with the films thereon can be weaken and dispersibility of the active material particles with the films thereon, the conductive additive, and CMC can be improved.

After the kneading is performed, water may further be added and mixing may be performed using a mixer or the like.

Then, SBR is added and mixing is performed using a mixer or the like. Here, a mixed liquid in which SBR and water have been mixed is preferably added to the mixture, in which case cohesion of SBR can be suppressed unlike in the case where SBR powder is added. Furthermore, dispersibility of other materials and SBR is improved in some cases.

After that, degasification may be performed. Through the above steps, a favorable paste in which the active material particles with the films thereon, the conductive additive, CMC, and SBR are uniformly dispersed can be formed.

CMC and SBR are uniformly dispersed, whereby when these binders cover the surfaces of the active material particles with the films thereon, the binders have a film-like shape whose thickness is not become too thick. As a result, the surfaces can be covered with a small amount of binders, and the proportion of an area in contact with the film-like binders with respect to the surfaces of the active material particles can be increased. The binders have low electric conductivity and thus might increase the resistance of the electrode when they cohere. Uniform dispersion of the binders can inhibit cohesion of the binders, so that a favorable electrode with high electric conductivity can be fabricated.

The current collector 102 may be subjected to surface treatment. Examples of such surface treatment include corona discharge treatment, plasma treatment, and undercoat treatment. The surface treatment can increase the wettability of the current collector 102 with respect to the paste. In addition, the adhesion between the current collector 102 and the active material layer 103 can be increased.

Here, the "undercoat" refers to a film formed over a current collector before application of paste onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black (registered trademark), and a carbon nanotube.

After that, the paste is applied to one or both of the surfaces of the current collector, and then the solvent contained in the paste is evaporated (Step 134). In the case where both the surfaces of the current collector are subjected to the coating step, the paste is applied to the surfaces at the same time or one by one, and then the solvent contained is evaporated. After that, rolling with a roller press machine is performed, whereby active material layers are formed so that the current collector is sandwiched therebetween.

For the application, a blade method or the like can be used. Furthermore, a continuous coater or the like can be used for the application. The step of evaporating the solvent contained in the paste is performed using a hot plate or a drying furnace in an air atmosphere or a reduced pressure atmosphere at a temperature in the range from room temperature to 200° C. The step can be performed in a plurality of steps. Alternatively, the temperature for the step may be increased in stages. In addition, heating time can be set appropriately. For example, heating is performed using a hot plate at a temperature in the range from 30° C. to 70° C. in an air atmosphere for longer than or equal to 10 minutes, and then, for example, heating is further performed at a temperature in the range from room temperature to 100° C. in a reduced-pressure environment for longer than or equal to 1 hour and shorter than or equal to 10 hours.

In the case of using a drying furnace, heating is performed at 30° C. or higher and 120° C. or lower for longer than or equal to 30 seconds and shorter than or equal to 20 minutes, for example. For example, after heating is performed at 60° C. or lower for shorter than or equal to 10 minutes, heating may further be performed at higher than or equal to 65° C. for longer than or equal to 1 minute.

The thickness of the active material layer 103 formed through the above steps is, for example, preferably greater than or equal to 5 μm and less than or equal to 500 μm, more preferably greater than or equal to 5 μm and less than or equal to 200 μm. Furthermore, the amount of the active material in the active material layer 103 is, for example, preferably greater than or equal to 2 mg/cm$^2$ and less than or equal to 50 mg/cm$^2$.

The active material layer 103 may be formed over only one surface of the current collector 102, or the active material layers 103 may be formed such that the current collector 102 is sandwiched therebetween. Alternatively, the active material layers 103 may be formed such that part of the current collector 102 is sandwiched therebetween.

Note that the active material layer 103 may be predoped. Predoping means making a compound containing no carrier ion have carrier ions in advance. There is no particular limitation on the method for predoping the active material layer 103. For example, the active material layer 103 may be predoped electrochemically. For example, before a battery is assembled, the active material layer 103 can be predoped with lithium in an electrolytic solution described later with the use of a lithium metal as a counter electrode.

By the above method, the electrode 101 illustrated in FIGS. 1A and 1B can be fabricated. Note that although not illustrated in FIG. 1B, the binder may include a part of the film separated from the surface of the active material particle because the materials are mixed in formation of the paste.

<Fabricating Method 2>

In Fabricating method 1, the example in which a mixed liquid containing the active material, silicone, a solvent, and the first solvent is put in a spray dryer and a film is formed on the surface of each active material particle is described. A conductive additive may be added to the mixed liquid. Another example of a fabricating method for an electrode will be described below. Note that Fabricating method 1 can be referred to for Fabricating method 2 except the composition of a mixed liquid, and repeated description is omitted.

First, an active material, silicone, a conductive additive, and the first solvent are mixed to prepare a mixed liquid. For the active material, silicone, and the conductive additive, any of the materials given as those for the active material, silicone, and the conductive additive in Embodiment 1 can be used. Here, graphite is used as the active material in the form of particles, and VGCF (registered trademark) with a needle-like shape is used as the conductive additive. As the first solvent, the solvent described in Fabricating method 1 can be used.

Next, the mixed liquid formed by mixing the active material, silicone, the conductive additive, and the first solvent is put in a spray dryer, and sprayed from the two-fluid nozzle 121, and the first solvent is evaporated in a moment in the spray cylinder 123. In the sprayed fine liquid drops, the entire or part of the surface of the active material particle is covered with silicone, and/or the entire or part of the surfaces of the active material particle and the conductive additive that have regions in contact with each other are covered with silicone. When the first solvent is evaporated in a moment, a mixture with a film thereon is formed.

The thus obtained mixture with the film thereon may be subjected to heat treatment. The heat treatment is performed, for example, on a hot plate at a temperature in the range from 40° C. to 300° C. for longer than or equal to 10 minutes and shorter than or equal to 10 hours. Through the heat treatment, the solvent left in the spray drying can be evaporated.

Then, the mixture with the film thereon after the heat treatment, a binder, and the second solvent are mixed to form a paste. Note that the conductive additive is already mixed into the mixed liquid and thus contained in the mixture with the film thereon, so that the conductive additive is not necessarily added in this step.

By the mixing, the active material particles, the conductive additive, and the binder are mixed while being in contact with each other. Consequently, part of the film might be separated, partly exposing the surface of the active material particle. In the exposed region, the active material particle might be directly in contact with one or more of another active material particle, a piece of conductive additive, and the binder. Furthermore, part of the film might be separated, partly exposing the surface of the conductive additive. In the exposed region, a piece of conductive additive might be directly in contact with one or more of the active material particle, another piece of conductive additive, and the binder.

For a step after the formation of the paste, Fabricating method 1 can be referred to; thus, the description thereof is omitted here.

Figure 3:
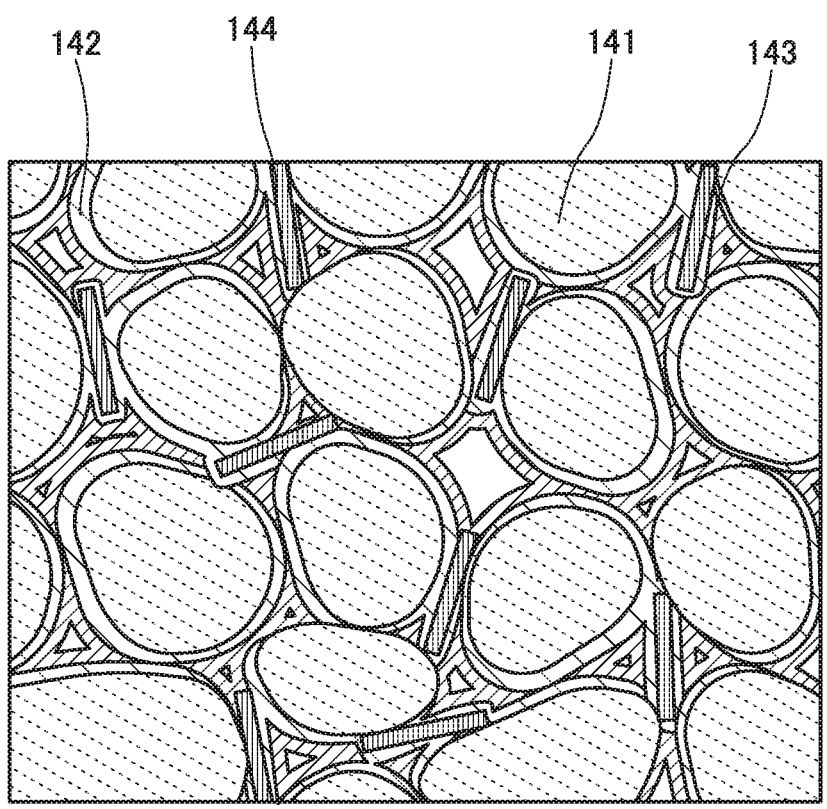
FIG. 3 illustrates an active material layer.

FIG. 3 is an enlarged cross-sectional view of an active material layer formed using Fabricating method 2. The surface of an active material particle 141 includes a region in contact with another active material particle 141. The surface of the active material particle 141 includes a region in contact with a conductive additive 144. The surface of the active material particle 141 includes a region in contact with a binder 143. The surface of the active material particle 141 except these regions is partly or entirely in contact with a film 142. The film 142 preferably entirely covers the surface of the active material particle 141 except the regions but may be formed on part of the surface of the active material particle 141.

In Fabricating method 2, the conductive additive is added in preparing the mixed liquid, whereby the film 142 can be formed on at least part of the surface of the active material particle and at least part of the surface of the conductive additive in the state where the active material particle is partly or entirely in contact with the conductive additive. Thus, the proportion of the active material particles 141 each having a region in contact with the conductive additive 144 without the film 142 therebetween can be higher in an active material layer formed using Fabricating method 2 than in the active material layer formed using Fabricating method 1, so that electron conduction paths increase.

The active material particles 141 are bound with the binder 143 in the state where they have regions in contact with each other, are adjacent to each other with the conductive additive 144 therebetween, and/or are adjacent to each other with the conductive additive 144 and the film 142 therebetween. In some cases, the active material layer includes a space formed by some of the active material particles 141.

As described in this embodiment, the spray dryer can evaporate the first solvent in a moment as soon as the mixed liquid including silicone is sprayed, so that the active material particles with the films thereon can be efficiently obtained. Furthermore, the method described in this embodiment allows obtaining active material particles with films thereon, as a material, in a stage before formation of a paste for electrode fabrication. Thus, compared with the method in which a film is formed on the surfaces of the active material particles through various steps after fabrication of an electrode, time for electrode fabrication can be shortened and a yield can be increased.

Furthermore, the method described in this embodiment allows a film including silicone to be formed on the surface of an active material particle in a stage of obtaining a material. Thus, an electrode on which the decomposition of an electrolytic solution is inhibited as much as possible and a passivating film is not easily formed can be fabricated. Furthermore, an electrode in which expansion of the active material particle is inhibited and that is less likely to deteriorate by being used at high temperatures can be fabricated.

Furthermore, as described in this embodiment, when the film is formed on the surface of an active material particle in a stage of obtaining a material, the film can be positioned also in a minute space formed by some active material particles adjacent to each other. Thus, the decomposition of an electrolytic solution on the electrode can be inhibited.

This embodiment can be implemented in combination with any of the other embodiments and examples as appropriate.

Embodiment 3

Described in this embodiment will be an example of a power storage device using the electrode of one embodiment of the present invention.

Note that the power storage device in this specification and the like indicates all elements and devices that have the function of storing power. For example, a storage battery such as a lithium-ion battery, a lithium-ion capacitor, and an electric double layer capacitor are included in the category of the power storage device.

(Thin Storage Battery)

FIG. 4 illustrates thin storage batteries (also referred to as laminated storage batteries) as examples of power storage devices. When a flexible thin storage battery is used in an electronic device at least part of which is flexible, the storage battery can be bent as the electronic device is bent.

In a laminated lithium-ion battery 500 illustrated in FIG. 4, a positive electrode 503 including a positive electrode current collector 501 and a positive electrode active material layer 502, a separator 507, and a negative electrode 506 including a negative electrode current collector 504 and a negative electrode active material layer 505 are stacked and sealed in an exterior body 509, and then an electrolytic solution 508 is injected into the exterior body 509. Although the laminated lithium-ion battery 500 in each of FIGS. 4A and 4B has a structure where one sheet-like positive electrode 503 and one sheet-like negative electrode 506 are stacked, it is preferred that the stack be rolled or a plurality of the stacks be stacked and then they be laminated in order to increase battery capacity. Particularly in the case of the laminated lithium-ion battery, the battery has flexibility and thus is suitable for applications that require flexibility.

In the laminated lithium-ion battery 500 illustrated in FIG. 4, the positive electrode current collector 501 and the negative electrode current collector 504 also serve as terminals for an electrical contact with an external portion. For this reason, each of the positive electrode current collector 501 and the negative electrode current collector 504 is arranged so that part of the positive electrode current collector 501 and part of the negative electrode current collector 504 are exposed to the outside the exterior body 509.

As the exterior body 509 in the laminated lithium-ion battery 500, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of an electrolytic solution and a gas can be blocked and an insulating property and resistance to the electrolytic solution can be obtained.

As at least one of the positive electrode 503 and the negative electrode 506, the electrode of one embodiment of the present invention can be used. The electrode of one embodiment of the present invention may be used as both the positive electrode 503 and the negative electrode 506. The use of the electrode of one embodiment of the present invention can inhibit decrease in the initial discharge capacity of the power storage device. Furthermore, it is possible to improve the long-term cycle performance of the power storage device. Moreover, the power storage device that can be repeatedly charged and discharged at high temperatures without a large decrease in discharge capacity can be provided.

In the case where both the positive electrode 503 and the negative electrode 506 are the electrodes of embodiments of the present invention, the decomposition of the electrolytic solution caused by a negative electrode reaction (e.g., mainly, oxidative decomposition) and the decomposition of the electrolytic solution caused by a positive electrode reaction (e.g., mainly, reductive decomposition) can be inhibited. Thus, it is possible that a storage battery having excellent properties can be fabricated even with the use of an electrolytic solution having a narrower potential window than a conventional electrolytic solution. In other words, a material for the electrolytic solution used in the storage battery can be selected from a wide range of alternatives. For example, a safer electrolytic solution such as a nonflammable electrolytic solution to which fluorine is added might have low resistance to oxidation; however, even in the case where such an electrolytic solution is selected, a decrease in capacity by charge and discharge can be inhibited, so that a power storage device having more excellent characteristics can be obtained.

Here, an example of using the electrode 101 described in Embodiment 1 as the negative electrode 506 will be described. The negative electrode 506 is fabricated by the method described in Embodiment 2.

Next, an example of the structure and fabricating method of the positive electrode 503 will be described with reference to FIGS. 5A and 5B.

Figure 5A:
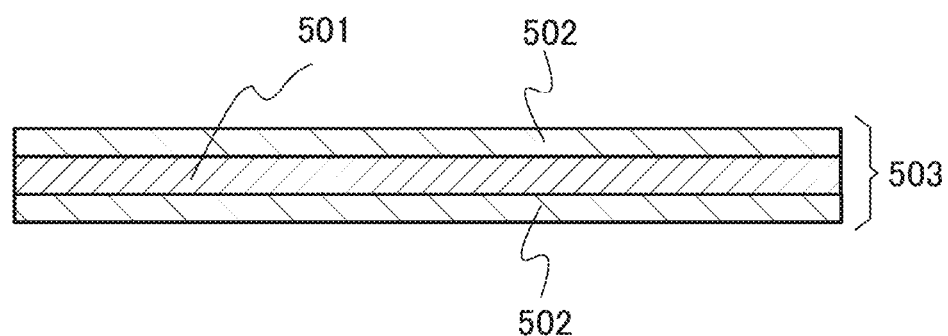
FIGS. 5A and 5B illustrate a positive electrode and a positive electrode active material layer.

FIG. 5A is a schematic cross-sectional view of the positive electrode 503 that includes a positive electrode current collector 501, and a positive electrode active material layer 502 provided over one of surfaces of the positive electrode current collector 501 or positive electrode active material layers 502 provided so that the positive electrode current collector 501 is sandwiched therebetween.

The positive electrode active material layer 502 does not necessarily have to be formed on and in direct contact with the positive electrode current collector 501. Any of the following functional layers may be formed using a conductive material such as a metal between the positive electrode current collector 501 and the positive electrode active material layer 502: an adhesion layer for increasing the adhesion between the positive electrode current collector 501 and the positive electrode active material layer 502; a planarization layer for reducing the roughness of the surface of the positive electrode current collector 501; a heat dissipation layer; a stress relaxation layer for relaxing the stress on the positive electrode current collector 501 or the positive electrode active material layer 502; and the like.

For the positive electrode current collector 501, any of the examples of the materials for the current collector that are described in Embodiment 1 can be selected to be used. The desired thickness of the positive electrode active material layer 502 is determined to be greater than or equal to 5 μm and less than or equal to 500 μm, preferably greater than or equal to 5 μm and less than or equal to 200 μm. It is preferred that the thickness of the positive electrode active material layer 502 be adjusted as appropriate so that a crack and separation are not caused.

Figure 5B:
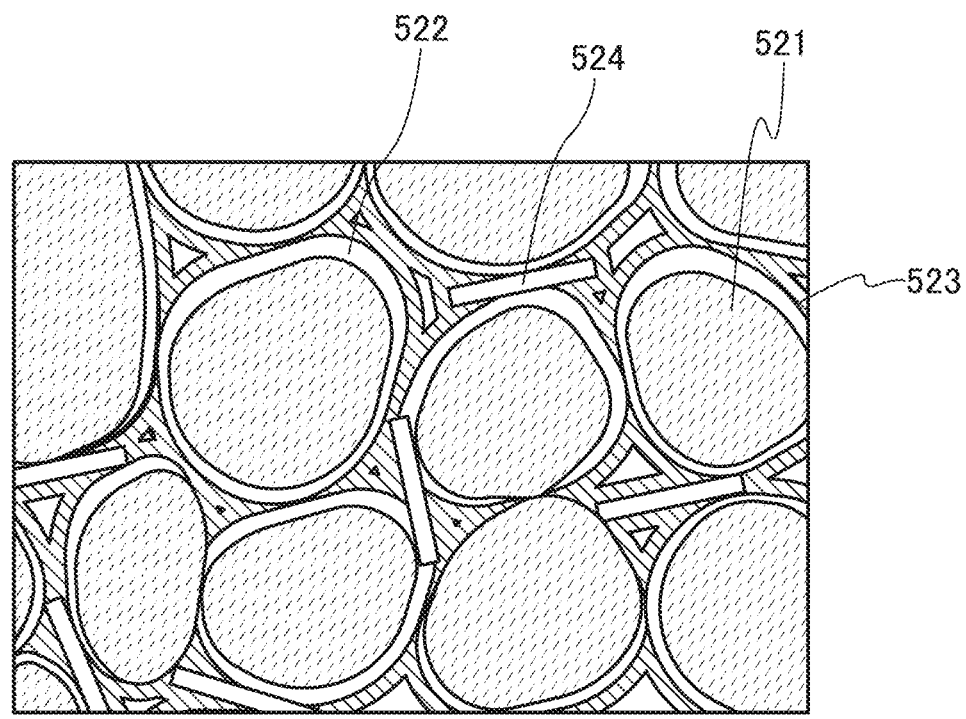

FIG. 5B is a longitudinal sectional view of the positive electrode active material layer 502. The positive electrode active material layer 502 includes positive electrode active material particles 521. As described above, an "active material" refers only to a material that relates to insertion and extraction of ions functioning as carriers. In this specification and the like, however, a layer including a conductive additive, a binder, or the like as well as a material that is actually a "active material" is also referred to as an active material layer.

The positive electrode active material described in Embodiment 1 can be used as the positive electrode active material particles 521. FIG. 5B illustrates an active material in the form of particles as the positive electrode active material particles 521. The size of the positive electrode active material particle 521 is preferably greater than or equal to 5 nm and less than or equal to 100 nm. Note that the size of the positive electrode active material particle 521 is preferably smaller because electrons move in the positive electrode active material particles 521.

The positive electrode active material layer 502 may further include a conductive additive 524. The conductive additive described in Embodiment 1 may be used as the conductive additive 524. In FIG. 5B, a fibrous conductive material is illustrated as the conductive additive 524.

The positive electrode active material layer 502 may further include a binder 523. As the binder 523, the binder described in Embodiment 1 can be used.

Here, it is preferred that the entire or part of the surface of the positive electrode active material particle 521 be covered with a film 522. As the film 522, a material that allows carrier ions to pass therethrough, such as silicone, can be used. Alternatively, graphene can be formed as the film 522. Graphene also functions as a conductive additive. Furthermore, graphene has a function of holding a positive electrode active material capable of receiving and releasing carrier ions.

The surface of one of the positive electrode active material particles 521 includes at least one of a region in contact with the surface of another positive electrode active material particle 521, a region in contact with the conductive additive 524, and a region in contact with the binder 523. The surface of the positive electrode active material particle 521 except these regions is partly or entirely covered with the film 522. The film 522 preferably cover the entire surface of the positive electrode active material particle 521 except the regions but may be formed on only part of the surface of the positive electrode active material particle 521. The positive electrode active material particles 521 are bound with the binder 523 in the state where they have regions in contact with each other, are adjacent to each other with the conductive additive 524 therebetween, and/or are adjacent to each other with the conductive additive 524 and the film 522 therebetween. In some cases, the positive electrode active material layer 502 includes a space formed by some of the positive electrode active material particles 521.

Depending on a material of the positive electrode active material particles 521, the volume thereof is expanded because of reception of ions serving as carriers. When such a material is used, the positive electrode active material layer gets vulnerable and is partly collapsed by charge and discharge, resulting in lower reliability of the power storage device. However, the film 522 covering the periphery of positive electrode active material particles 521 allows prevention of dispersion of the positive electrode active material particles and the collapse of the positive electrode active material layer, even when the volume of the positive electrode active material particles is increased and decreased by charge and discharge.

Next, a method for forming the positive electrode active material layer 502 will be described.

In the case where silicone is used as the film 522, the positive electrode active material layer 502 can be formed using the forming method described in Embodiment 2. Next, an example of a method for forming the positive electrode active material layer 502 when graphene is formed as the film 522 will be described.

First, a paste containing positive electrode active material particles, a conductive additive, a binder, and graphene oxide is formed. Then, the paste is applied to the positive electrode current collector 501. After that, heating is performed in a reducing atmosphere for reduction treatment so that the positive electrode active material particles are baked and part of oxygen is released from graphene oxide to form graphene. Note that oxygen in the graphene oxide is not entirely released and partly remains in the graphene. Through the above steps, the positive electrode active material layer 502 can be provided over the positive electrode current collector 501. Forming graphene increases the conductivity of the positive electrode active material layer 502.

Through the above process, the positive electrode 503 including the positive electrode active material layer 502 that includes the positive electrode active material particles 521 with the films 522 thereon, the conductive additive 524, and the binder 523 can be fabricated.

Note that the positive electrode active material layer 502 may be formed over one of surfaces of the positive electrode current collector 501 or positive electrode active material layers 502 formed so that the positive electrode current collector 501 is sandwiched therebetween. Alternatively, the positive electrode active material layers 502 may be formed part of the positive electrode current collector 501 is sandwiched therebetween.

The positive electrode current collector 501 may be subjected to surface treatment. Examples of such surface treatment include corona discharge treatment, plasma treatment, and undercoat treatment. The surface treatment increases the wettability of the positive electrode current collector 501 to the positive electrode paste. In addition, the adhesion between the positive electrode current collector 501 and the positive electrode active material layer 502 can be increased.

The positive electrode active material layer 502 may be pressed by a compression method such as a roll press method or a flat plate press method so as to be consolidated.

Next, the separator 507 will be described below. As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

The separator 507 is preferably formed to have a bag-like shape to surround one of the positive electrode 503 and the negative electrode 506. For example, the separator 507 is folded in half such that the negative electrode 506 is sandwiched, and sealed in a region outside the region overlapping with the negative electrode 506; thus, the negative electrode 506 can be reliably supported inside the separator 507. Then, the positive electrodes 503 and the negative electrodes 506 surrounded by the separator 507 are alternately stacked and provided so as to be surrounded by the exterior body 509, whereby the laminated lithium-ion battery 500 can be fabricated.

The electrolytic solution 508 will be described. As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a high-molecular material that undergoes gelation is used as a solvent of the electrolytic solution, safety against liquid leakage and the like is improved. Furthermore, a secondary battery can be thinner and more lightweight. Typical examples of the high-molecular material that undergoes gelation include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a gelled electrolyte obtained in such a manner that a polymer is swelled with an electrolytic solution may be used. Examples of the gelled electrolyte (polymer-gel electrolyte) include a host polymer that is used as a support and contains the electrolytic solution described above.

Examples of a host polymer include a polymer having a polyalkylene oxide structure, such as PEO; PVdF; polyacrylonitrile; and a copolymer containing any of them. For example, PVdF-HFP, which is a copolymer of PVdF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a polymeric material such as a PEO-based polymeric material, a gelled electrolyte, or the like can alternatively be used. When the solid electrolyte is used, a separator and a spacer are not necessary. Furthermore, in the case where a solid electrolyte or a gelled electrolyte is used, the battery can be entirely solidified or gelled; therefore, there is no possibility of liquid leakage and thus the safety of the battery is dramatically increased.

The example in FIG. 4 includes one positive electrode-negative electrode pair (the positive and negative electrodes face each other). It is needless to say that the number of pairs of electrodes is not limited to one, and may be more than one. In the case of using a large number of electrode layers, the storage battery can have high capacity. In contrast, in the case of using a small number of electrode layers, the storage battery can have a small thickness and high flexibility.

<Coin-Type Storage Battery>

Figure 6A:
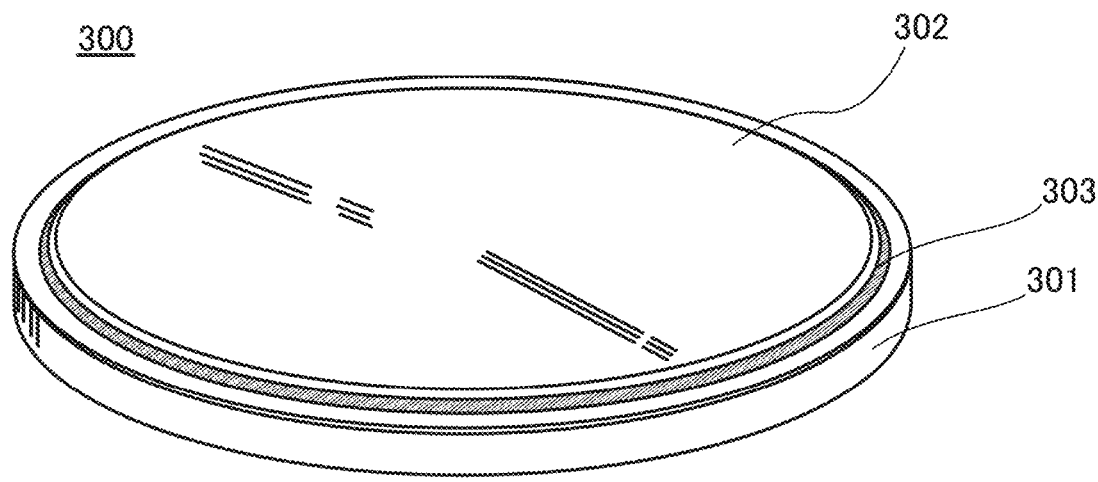
FIGS. 6A and 6B illustrate a coin-type lithium-ion battery.
Figure 6B:
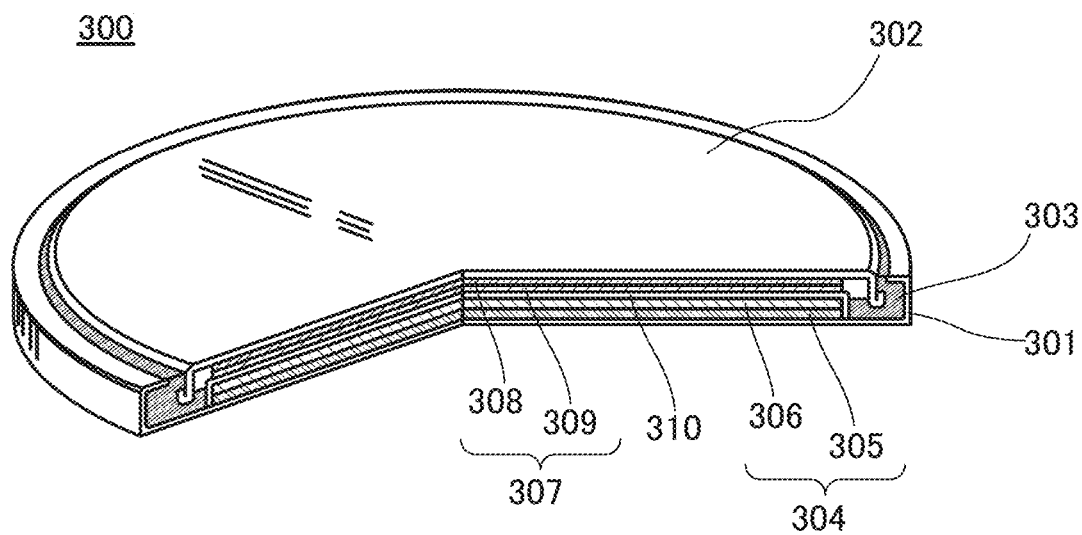

Next, an example of a coin-type storage battery will be described as an example of a power storage device with reference to FIGS. 6A and 6B. FIG. 6A is an external view of a coin-type (single-layer flat type) storage battery, and FIG. 6B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The description of the positive electrode active material layer 502 can be referred to for the positive electrode active material layer 306.

A negative electrode 307 includes a negative electrode current collector 308 and a negative electrode active material layer 309 provided in contact with the negative electrode current collector 308. The description of the active material layer 103 of Embodiment 1 can be referred to for the negative electrode active material layer 309. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 6B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

<Cylindrical Storage Battery>

Figure 7A:
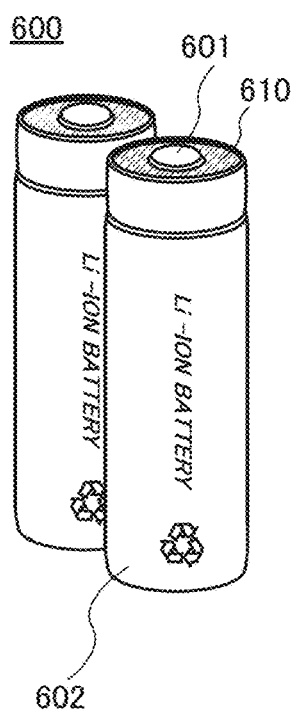
FIGS. 7A and 7B illustrate a cylindrical lithium-ion battery.

Next, an example of a cylindrical storage battery will be described as an example of a power storage device with reference to FIGS. 7A and 7B. As illustrated in FIG. 7A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 7B:
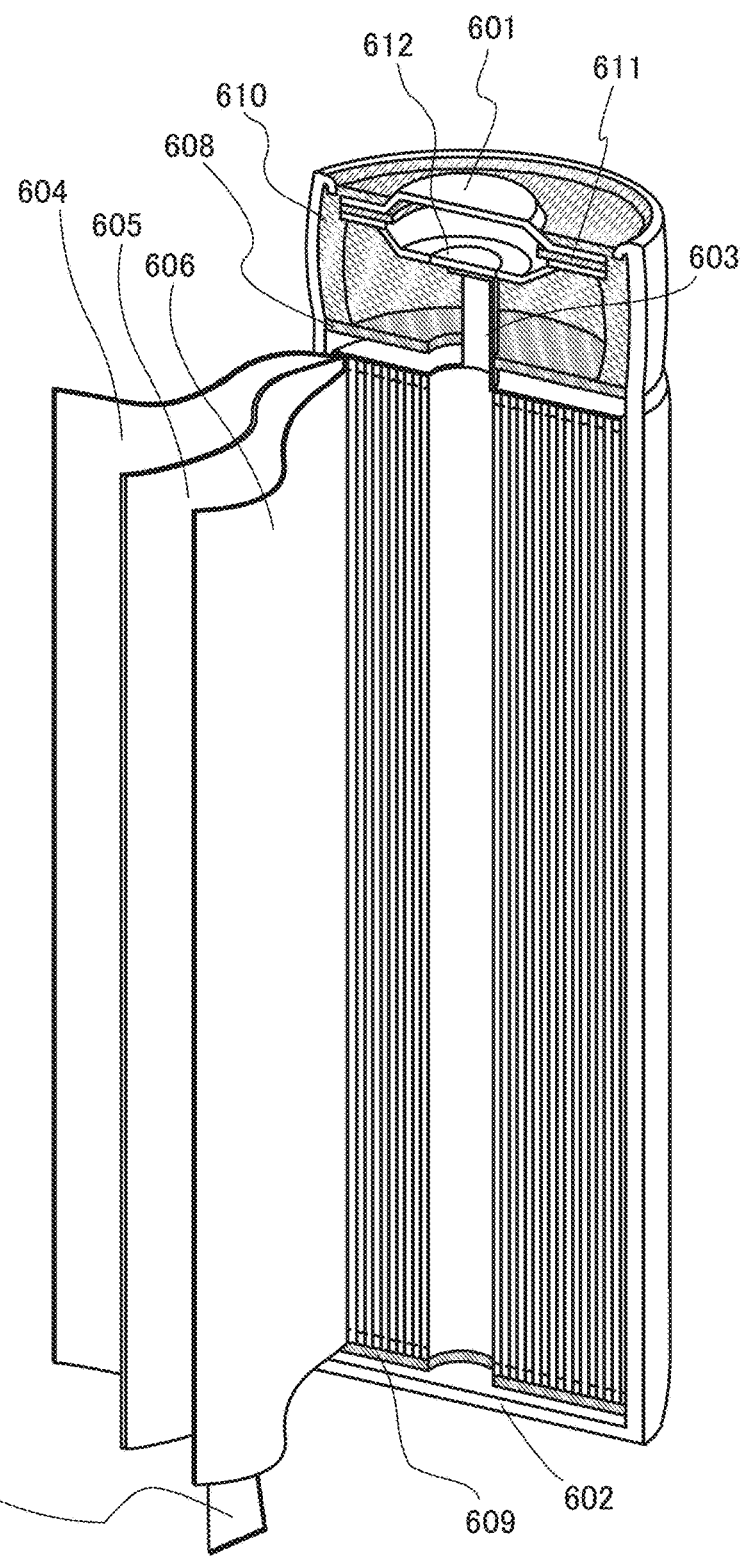

FIG. 7B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a non-aqueous electrolytic solution (not illustrated) is injected inside the battery can 602 provided with the battery element. As the nonaqueous electrolytic solution, a nonaqueous electrolytic solution that is similar to those of the coin-type storage battery can be used.

The positive electrode 604 and the negative electrode 606 can be formed in a manner similar to that of the positive electrode and the negative electrode of the thin storage battery described above. Since the positive electrode and the negative electrode of the cylindrical storage battery are wound, active material layers are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are welded to a safety valve mechanism 612 and the inner bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

Note that in this embodiment, the thin storage battery, the coin-type storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed. For example, FIGS. 8A to 8C, FIGS. 9A to 9C, FIGS. 10A and 10B, FIGS. 11A1 to 11B2, and FIGS. 12A and 12B illustrate examples of other storage batteries.

<Structural Example of Storage Battery>

FIGS. 8A to 8C and FIGS. 9A to 9C illustrate structural examples of thin storage batteries. A wound body 993 illustrated in FIG. 8A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is surrounded by a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 8A:
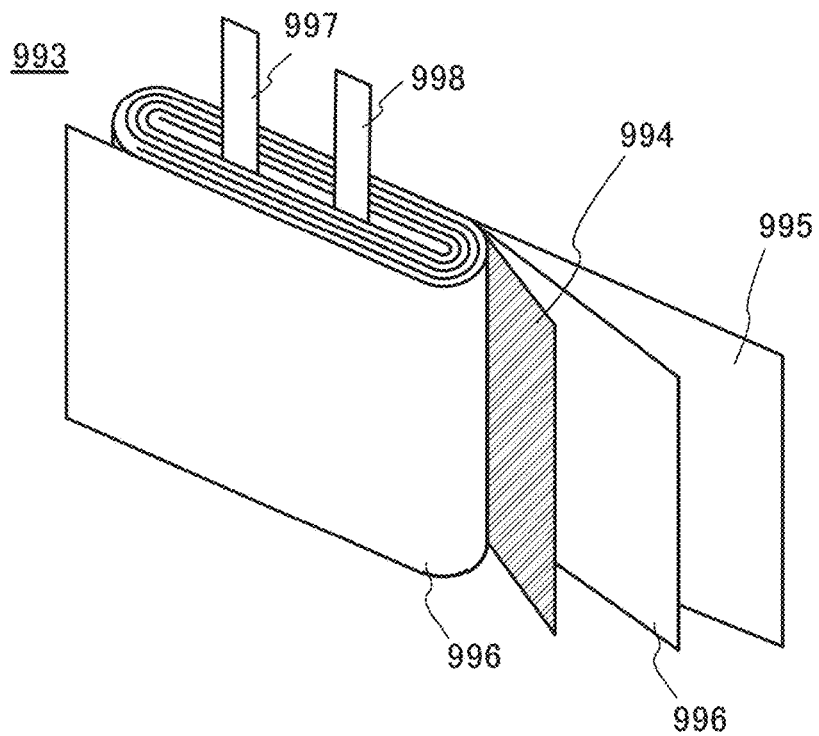
FIGS. 8A to 8C illustrate a power storage device.
Figure 8B:
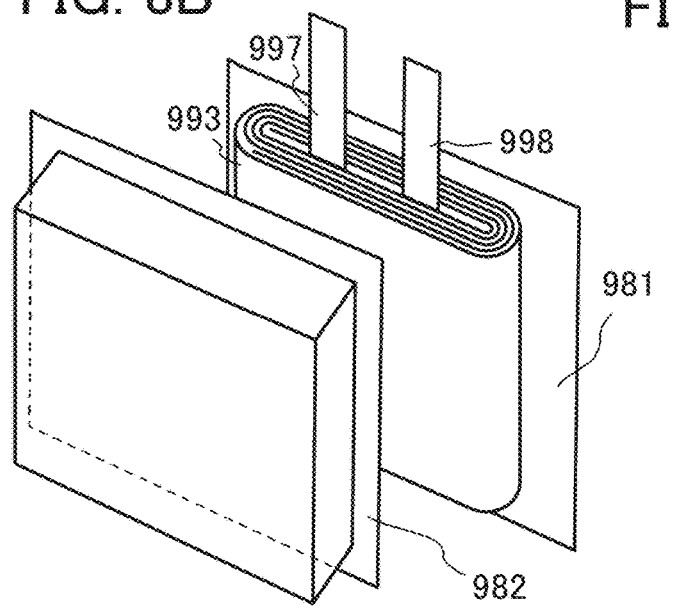
Figure 8C:
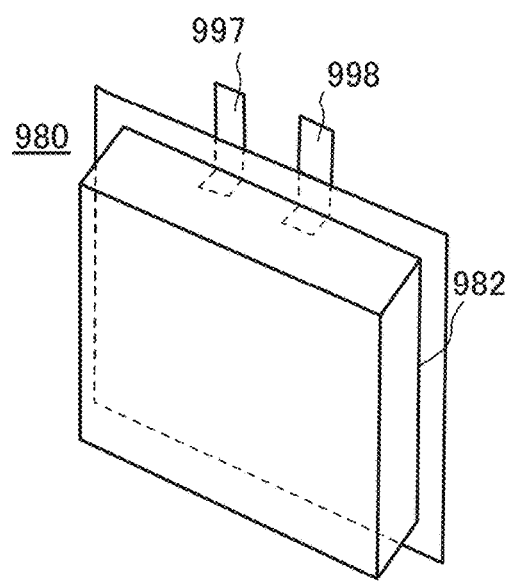

In a storage battery 980 illustrated in FIGS. 8B and 8C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 8B and 8C illustrate an example where a space is formed by two films, the wound body 993 may be placed in a space formed by bending one film.

Furthermore, in fabricating a flexible power storage device, a resin material or the like can be used for an exterior body and a sealed container of the power storage device. Note that in the case where a resin material is used for the exterior body and the sealed container, a conductive material is used for a portion connected to the outside.

For example, FIGS. 9B and 9C illustrate another example of a flexible thin storage battery. The wound body 993 illustrated in FIG. 9A is the same as that illustrated in FIG. 8A, and the detailed description thereof is omitted.

In a storage battery 990 illustrated in FIGS. 9B and 9C, the wound body 993 is surrounded by an exterior body 991. The wound body 993 includes the lead electrode 997 and the lead electrode 998, and is soaked in an electrolytic solution in an area surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

<Structural Example of Power Storage System>

Structural examples of power storage systems will be described with reference to FIGS. 10A and 10B, FIGS. 11A1 to 11B2, and FIGS. 12A and 12B. Here, a power storage system refers to, for example, a device including a power storage device.

Figure 10A:
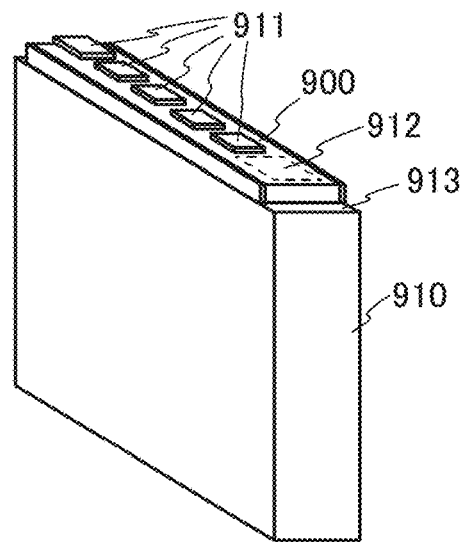
FIGS. 10A and 10B illustrate a power storage device.
Figure 10B:
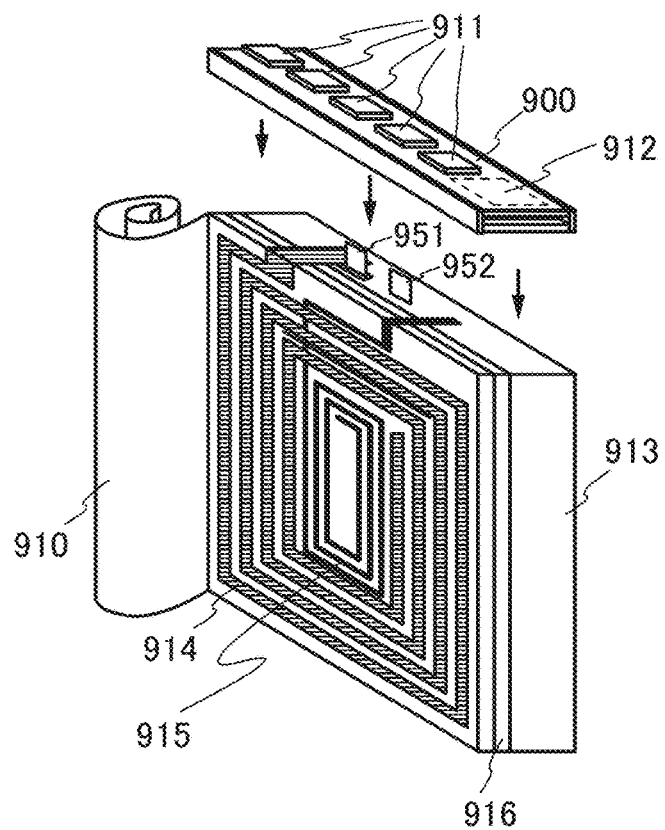

FIGS. 10A and 10B are external views of a power storage system. The power storage system includes a circuit board 900 and a storage battery 913. A label 910 is attached to the storage battery 913. As shown in FIG. 10B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, power can be transmitted and received not only by an electromagnetic field or a magnetic field but also by an electric field.

The line width of the antenna 914 is preferably larger than that of the antenna 915. This makes it possible to increase the amount of power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 10A and 10B.

For example, as shown in FIGS. 11A1 and 11A2, two opposite surfaces of the storage battery 913 in FIGS. 10A and 10B may be provided with respective antennas. FIG. 11A1 is an external view showing one side of the opposite surfaces, and FIG. 11A2 is an external view showing the other side of the opposite surfaces. For portions similar to those in FIGS. 10A and 10B, the description of the power storage system illustrated in FIGS. 10A and 10B can be referred to as appropriate.

As illustrated in FIG. 11A1, the antenna 914 is provided on one of the opposite surfaces of the storage battery 913 with the layer 916 interposed therebetween, and as illustrated in FIG. 11A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 11B1 and 11B2, two opposite surfaces of the storage battery 913 in FIGS. 10A and 10B may be provided with different types of antennas. FIG. 11B1 is an external view showing one side of the opposite surfaces, and FIG. 11B2 is an external view showing the other side of the opposite surfaces. For portions similar to those in FIGS. 10A and 10B, the description of the power storage system illustrated in FIGS. 10A and 10B can be referred to as appropriate.

As illustrated in FIG. 11B1, the antenna 914 is provided on one of the opposite surfaces of the storage battery 913 with the layer 916 interposed therebetween, and as illustrated in FIG. 11B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 12A:
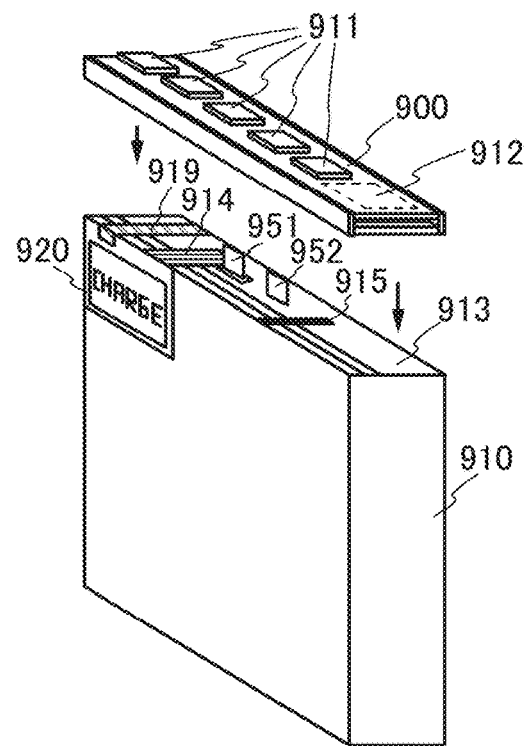
FIGS. 12A and 12B each illustrate a power storage device.

Alternatively, as illustrated in FIG. 12A, the storage battery 913 in FIGS. 10A and 10B may be provided with a display device 920. The display device 920 is electrically connected to the terminal 911 via a terminal 919. It is possible that the label 910 is not provided in a portion where the display device 920 is provided. For portions similar to those in FIGS. 10A and 10B, the description of the power storage system illustrated in FIGS. 10A and 10B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 12B:
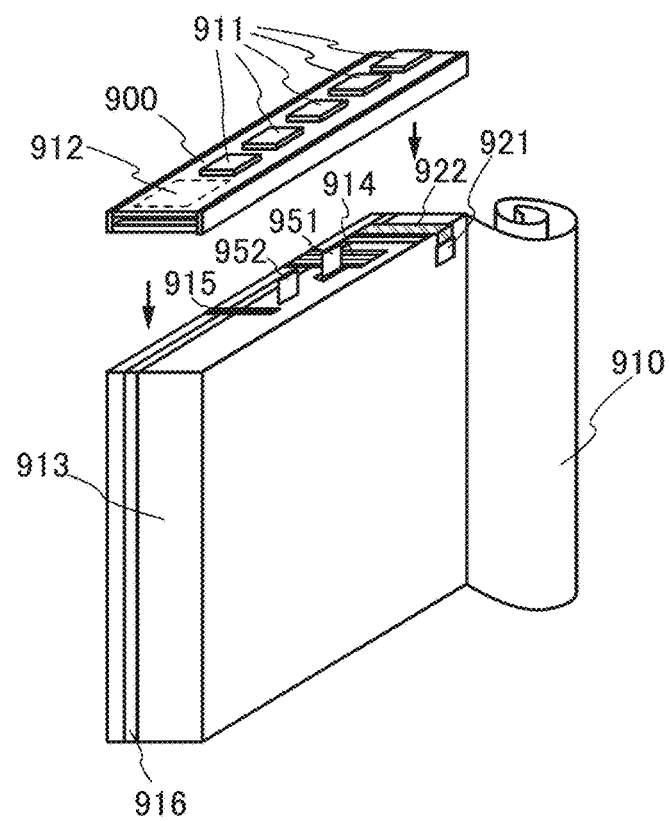

Alternatively, as illustrated in FIG. 12B, the storage battery 913 illustrated in FIGS. 10A and 10B may be provided with a sensor 921. The sensor 921 is electrically connected to the terminal 911 via a terminal 922. For portions similar to those in FIGS. 10A and 10B, the description of the power storage system illustrated in FIGS. 10A and 10B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 4

In this embodiment, an example of an electronic device including a flexible storage battery will be described.

FIGS. 13A to 13G illustrate examples of electronic devices including the flexible storage batteries described in Embodiment 3. Examples of electronic devices each including a flexible storage battery include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 13A:
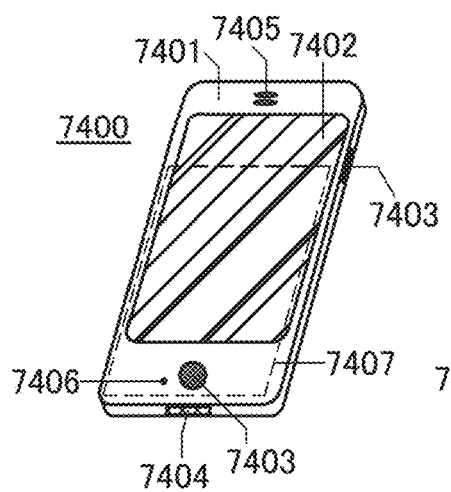
FIGS. 13A to 13G each illustrate an electronic device.

FIG. 13A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 13B:
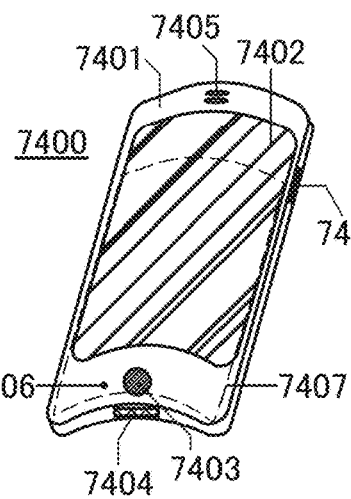
Figure 13C:
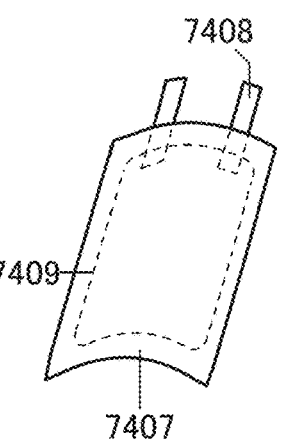

FIG. 13B illustrates the mobile phone 7400 that is bent. When the whole mobile phone 7400 is bent by the external force, the power storage device 7407 included in the mobile phone 7400 is also bent. FIG. 13C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved. Consequently, the power storage device 7407 can have high reliability even in a state of being bent.

Figure 13D:
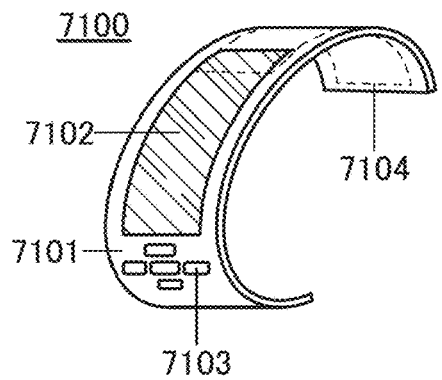
Figure 13E:
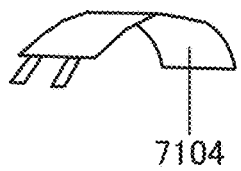

FIG. 13D illustrates an example of a bangle display device. A portable display device 7100 includes a housing 7101, a display portion 7102, an operation button 7103, and a power storage device 7104. FIG. 13E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high.

Figure 13F:
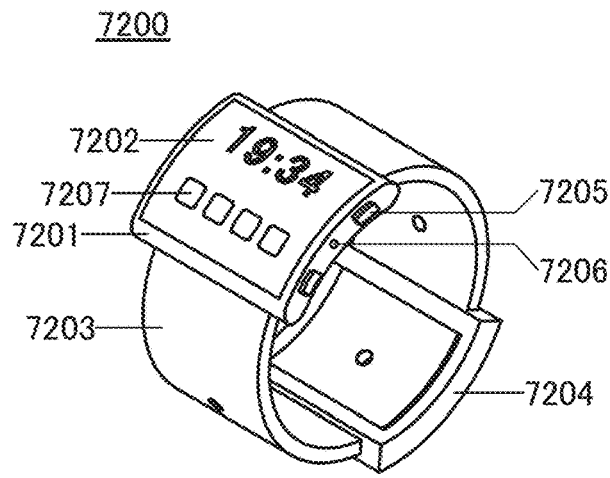

FIG. 13F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 13E that is in the state of being curved can be provided in the housing 7201. Alternatively, the power storage device 7104 illustrated in FIG. 13E can be provided in the band 7203 such that it can be curved.

Figure 13G:
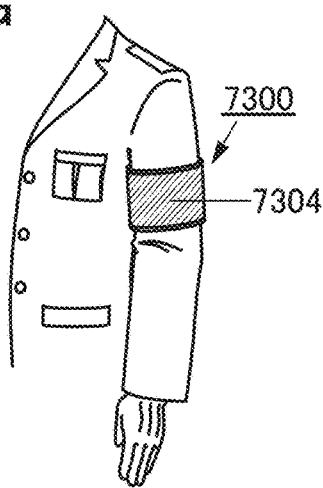

FIG. 13G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

Embodiment 5

In this embodiment, examples of electronic devices that can include power storage devices will be described.

Figure 14A:
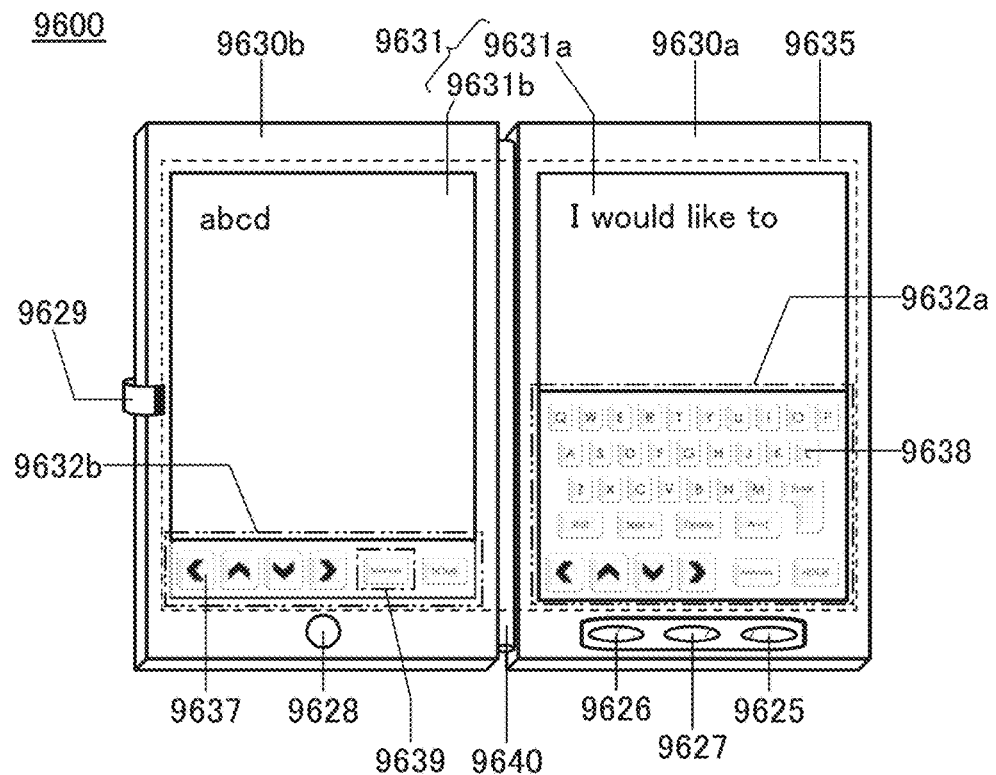
FIGS. 14A to 14C illustrate an electronic device.
Figure 14B:
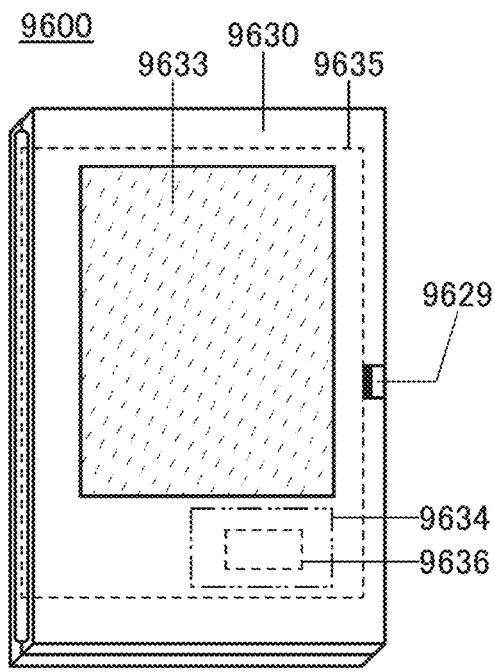

FIGS. 14A and 14B illustrate an example of a tablet terminal that can be folded in half. A tablet terminal 9600 illustrated in FIGS. 14A and 14B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 14A illustrates the tablet terminal 9600 that is opened, and FIG. 14B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631a can be a touch panel region 9632a, and data can be input by touching operation keys 9638 that are displayed. Note that FIG. 14A shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 14A, one embodiment of the present invention is not limited to this example. The display portion 9631a and the display portion 9631b may have different areas or different display quality. For example, one of the display portions 9631a and 9631b may display higher definition images than the other.

The tablet terminal is closed in FIG. 14B. The tablet terminal includes the housing 9630, a solar cell 9633, and a charge and discharge control circuit 9634 including a DC-DC converter 9636. The power storage device of one embodiment of the present invention is used as the power storage unit 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the use of the power storage device of one embodiment of the present invention as the power storage unit 9635 provides flexibility, and the power storage unit 9635 can be repeatedly bent without a significant decrease in charge and discharge capacity. Thus, a highly reliable tablet terminal can be provided.

The tablet terminal illustrated in FIGS. 14A and 14B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, is capable of supplying power to a touch panel, a display portion, an image signal processing portion, and the like. Note that the solar cell 9633 can be provided on one or both surfaces of the housing 9630 and the power storage unit 9635 can be charged efficiently. The use of the power storage device of one embodiment of the present invention as the power storage unit 9635 can inhibit decrease in discharge capacity caused by repeated charge and discharge; thus, a tablet terminal that can be used over a long period of time can be provided.

Figure 14C:
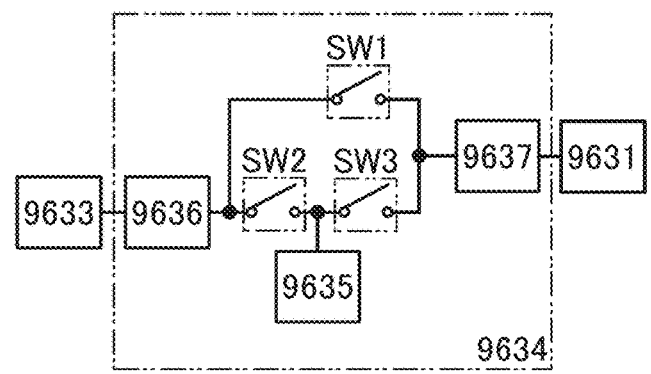

The structure and operation of the charge and discharge control circuit 9634 illustrated in FIG. 14B will be described with reference to a block diagram in FIG. 14C. The solar cell 9633, the power storage unit 9635, the DC-DC converter 9636, a converter 9637, switches SW1 to SW3, and the display portion 9631 are illustrated in FIG. 14C, and the power storage unit 9635, the DC-DC converter 9636, the converter 9637, and the switches SW1 to SW3 correspond to the charge and discharge control circuit 9634 in FIG. 14B.

First, an example of operation when power is generated by the solar cell 9633 using external light will be described. The voltage of power generated by the solar cell is raised or lowered by the DC-DC converter 9636 to a voltage for charging the power storage unit 9635. When the display portion 9631 is operated with the power from the solar cell 9633, the switch SW1 is turned on and the voltage of the power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving power wirelessly (without contact), or any of the other charge means used in combination.

Figure 15:
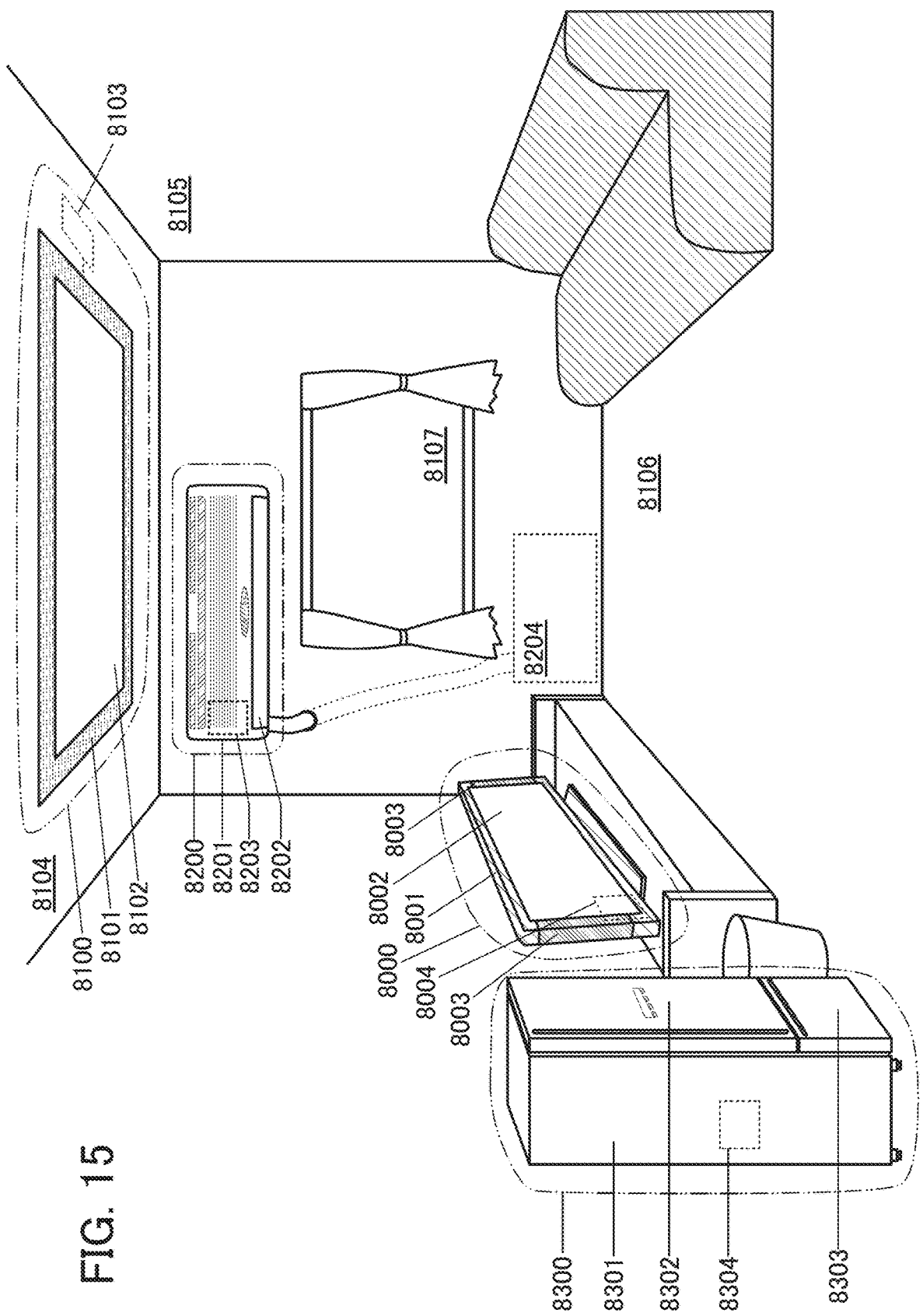
FIG. 15 illustrates electronic devices.

FIG. 15 illustrates other examples of electronic devices. In FIG. 15, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive power from a commercial power supply. Alternatively, the display device 8000 can use power stored in the power storage device 8004. Thus, the display device 8000 can be operated with the use of the power storage device 8004 of one embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 15, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 15 illustrates the case where the power storage device 8103 is provided in a ceiling 8104 on which the housing 8101 and the light source 8102 are installed, the power storage device 8103 may be provided in the housing 8101. The lighting device 8100 can receive power from a commercial power supply. Alternatively, the lighting device 8100 can use power stored in the power storage device 8103. Thus, the lighting device 8100 can be operated with the use of power storage device 8103 of one embodiment of the present invention as an uninterruptible power supply even when power cannot be supplied from a commercial power supply due to power failure or the like.

Note that although the installation lighting device 8100 provided in the ceiling 8104 is illustrated in FIG. 15 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using power can be used. Specifically, an incandescent lamp, a discharge lamp such as a fluorescent lamp, and light-emitting elements such as an LED and an organic EL element are given as examples of the artificial light source.

In FIG. 15, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 15 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive power from a commercial power supply. Alternatively, the air conditioner can use power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when power cannot be supplied from a commercial power supply due to power failure or the like.

Note that although the split-type air conditioner including the indoor unit and the outdoor unit is illustrated in FIG. 15 as an example, the power storage device of one embodiment of the present invention can be used in an air conditioner in which the functions of an indoor unit and an outdoor unit are integrated in one housing.

In FIG. 15, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 15. The electric refrigerator-freezer 8300 can receive power from a commercial power supply. Alternatively, the electric refrigerator-freezer 8300 can use power stored in the power storage device 8304. Thus, the electric refrigerator-freezer 8300 can be operated with the use of the power storage device 8304 of one embodiment of the present invention as an uninterruptible power supply even when power cannot be supplied from a commercial power supply due to power failure or the like.

This embodiment can be implemented in combination with any of the other embodiments as appropriate.

Embodiment 6

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 16A:
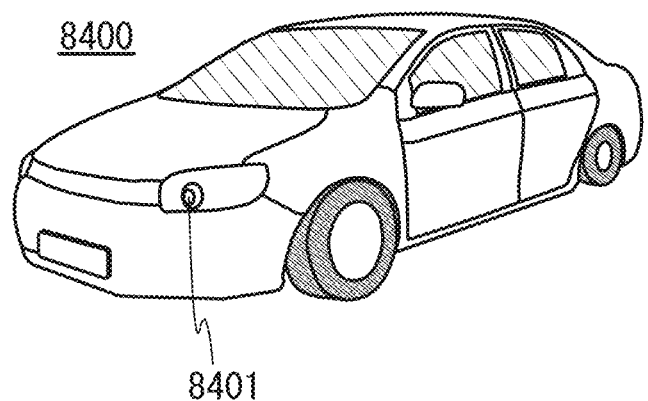
FIGS. 16A and 16B each illustrate an electronic device.
Figure 16B:
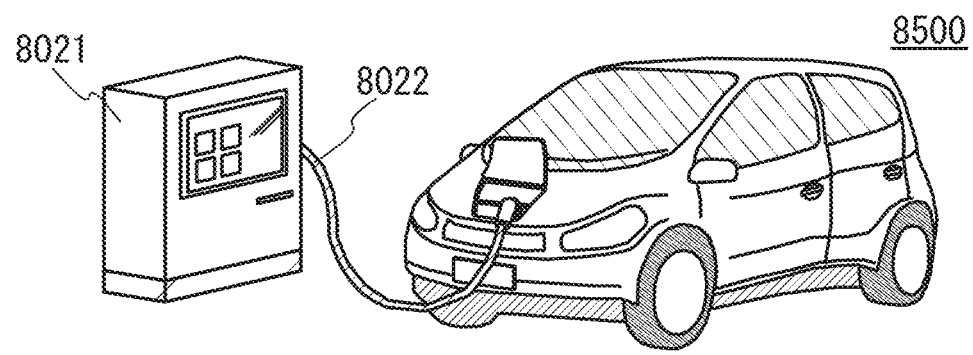

FIGS. 16A and 16B each illustrate an example of a vehicle using one embodiment of the present invention. An automobile 8400 illustrated in FIG. 16A is an electric vehicle that runs on the power of an electric motor. Alternatively, the automobile 8400 is a hybrid electric vehicle capable of driving appropriately using either the electric motor or the engine. One embodiment of the present invention can provide a high-mileage vehicle. The automobile 8400 includes the power storage device. The power storage device is used not only for driving the electric motor, but also for supplying power to a light-emitting device such as a headlight 8401 or a room light (not illustrated).

The power storage device can also supply power to a display device of a speedometer, a tachometer, or the like included in the automobile 8400. Furthermore, the power storage device can supply power to a semiconductor device included in the automobile 8400, such as a navigation system.

FIG. 16B illustrates an automobile 8500 including the power storage device. The automobile 8500 can be charged when the power storage device is supplied with power through external charging equipment by a plug-in system, a contactless power feeding system, or the like. In FIG. 16B, a power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device included in the automobile 8500 can be charged by being supplied with power from outside. The charging can be performed by converting AC power into DC power through a converter such as an AC-DC converter.

Furthermore, although not illustrated, the vehicle may include a power receiving device so that it can be charged by being supplied with power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of power between vehicles. Furthermore, a solar cell may be provided in the exterior of the automobile to charge the power storage device when the automobile stops or moves. To supply power in such a contactless manner, an electromagnetic induction method or a magnetic resonance method can be used.

According to one embodiment of the present invention, the power storage device can have improved cycle performance and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying power to products other than the vehicle. In such a case, the use of a commercial power source can be avoided at peak time of power demand.

This embodiment can be implemented in combination with any of the other embodiments as appropriate.

Example 1

One embodiment of the present invention will be specifically described below with examples. Note that one embodiment of the present invention is not limited to the following examples.

First, a method for fabricating an electrode used in this example will be described.

Silicone used in this example will be described. KR-400 (manufactured by Shin-Etsu Chemical Co., Ltd.) used for fabrication of Example A and Example C is silicone having a methyl group. KR-9218 (manufactured by Shin-Etsu Chemical Co., Ltd.) used for fabrication of Example B, Example B', and Example D is silicone having a methoxy group, a methyl group, and a phenyl group.

Example A

Example A was fabricated using active material particles with films thereon. First, artificial graphite MCMB, KR-400 (manufactured by Shin-Etsu Chemical Co., Ltd.), and a 97% ethanol aqueous solution were used to prepare a mixed liquid. As described in Embodiment 2, the amount of KR-400 was determined in a stage of preparing the mixed liquid such that the proportion of KR-400 to graphite in the mixed liquid was 1 wt %. The mixed liquid was put into a spray dryer, and the solvent in the sprayed mixed liquid was evaporated in a moment in a spray cylinder with a nitrogen atmosphere at 100° C., so that powder of graphite with the film was obtained.

Next, graphite with a film thereon as an active material, VGCF (registered trademark) as a conductive additive and CMC-Na and SBR as binders were used to form a paste in which the weight ratio of graphite with the film to VGCF (registered trademark), CMC-Na, and SBR was 96:1:1:2. As a solvent of the paste, pure water was used.

In forming the paste, graphite with the film, VGCF (registered trademark), and a small amount of pure water were mixed first, an aqueous solution where CMC-Na was uniformly dissolved in pure water was added to the mixture, and then mixing was performed. The mixing was performed with a planetary mixer.

Then, an SBR mixed liquid was added to the mixture, and mixing was performed with a mixer.

Pure water was then added to the mixture until a predetermined viscosity was obtained, and mixing was performed with a mixer for 5 minutes twice.

Subsequently, the paste was applied to a current collector with the use of a blade, and the solvent contained in the paste was evaporated. In the step, heating was performed at 30° C. in an air atmosphere and then the temperature was raised to 50° C., and heating was further performed at 100° C. in a reduced pressure atmosphere for ten hours. As the current collector, 18-μm-thick rolled copper foil was used.

Through the above steps, Example A was fabricated.

Example B

Graphite with a film was formed using KR-9218 (manufactured by Shin-Etsu Chemical Co., Ltd.), and Example B was fabricated using the graphite with the film. The structure and a fabricating method of Example B are the same as those of Example A except for silicone; thus, the description thereof is omitted here.

Example B'

The graphite with the film formed using KR-9218 was heated at 300° C. in a reduced pressure atmosphere for 10 hours. Example B' was fabricated using the graphite with the film as in the fabricating method for Example B.

Example C

Example C is different from Example A in the proportion of KR-400 to graphite. Specifically, in the case of Example C, the amount of KR-400 was determined such that the proportion of KR-400 to graphite was 0.5 wt % in a stage of preparing a mixed liquid. The structure and a fabricating method of Example C are the same as those of Example A except for the proportion of KR-400; thus, the description thereof is omitted here.

Example D

Example D is different from Example B in the proportion of KR-9218 to graphite. Specifically, in the case of Example D, the amount of KR-9218 was determined such that the proportion of KR-9218 to graphite was 0.5 wt % in a stage of preparing a mixed liquid. The structure and a fabricating method of Example D are the same as those of Example B except for the proportion of KR-9218; thus, the description thereof is omitted here.

Comparative Example E

Examples A to D are each an electrode fabricated using graphite with the film, whereas Comparative example E is an electrode fabricated using graphite without a film. In the case of Comparative example E, artificial graphite MCMB as an active material, VGCF (registered trademark) as a conductive additive, and CMC-Na and SBR as binders were used to form a paste in which the weight ratio of graphite to VGCF (registered trademark), CMC-Na, and SBR was 96:1:1:2. As a solvent of the paste, pure water was used.

In forming the paste, graphite, VGCF (registered trademark), and a small amount of pure water were mixed first, an aqueous solution where CMC-Na was uniformly dissolved in pure water was added to the mixture, and then mixing was performed. The mixing was performed with a planetary mixer.

Then, an SBR aqueous solution was added to the mixture, and mixing was performed with a mixer.

Then, pure water was added to the mixture until a predetermined viscosity was obtained, and mixing was performed with a mixer for 5 minutes twice.

The structure and a fabricating method of Example E are the same as those of Example A except that an active material without a film is used; thus, the description thereof is omitted here. Through the above steps, Example E was fabricated.

Table 1 shows fabricating conditions of Examples A to D and Comparative example E.

TABLE 1

|  | Example A | Example B | Example B' | Example C | Example D | Example E |
|---|---|---|---|---|---|---|
| silicone | KR-400 | KR-9218 | KR-9218 | KR-400 | KR-9218 | — |
| proportion of silicone | 1 wt % | 1 wt % | 1 wt % | 0.5 wt % | 0.5 wt % | — |
| heating temperature | — | — | 300° C. | — | — | — |

(TEM Observation)

Graphite with the film that was obtained by the spray drying step and used to fabricate Examples A and B was sliced using a focused ion beam system (FIB), and then the cross section thereof was observed. The cross section was observed with a high-resolution transmission electron microscope (TEM) ("H9000-NAR" manufactured by Hitachi, Ltd.) at an acceleration voltage of 200 kV.

Figure 17A:
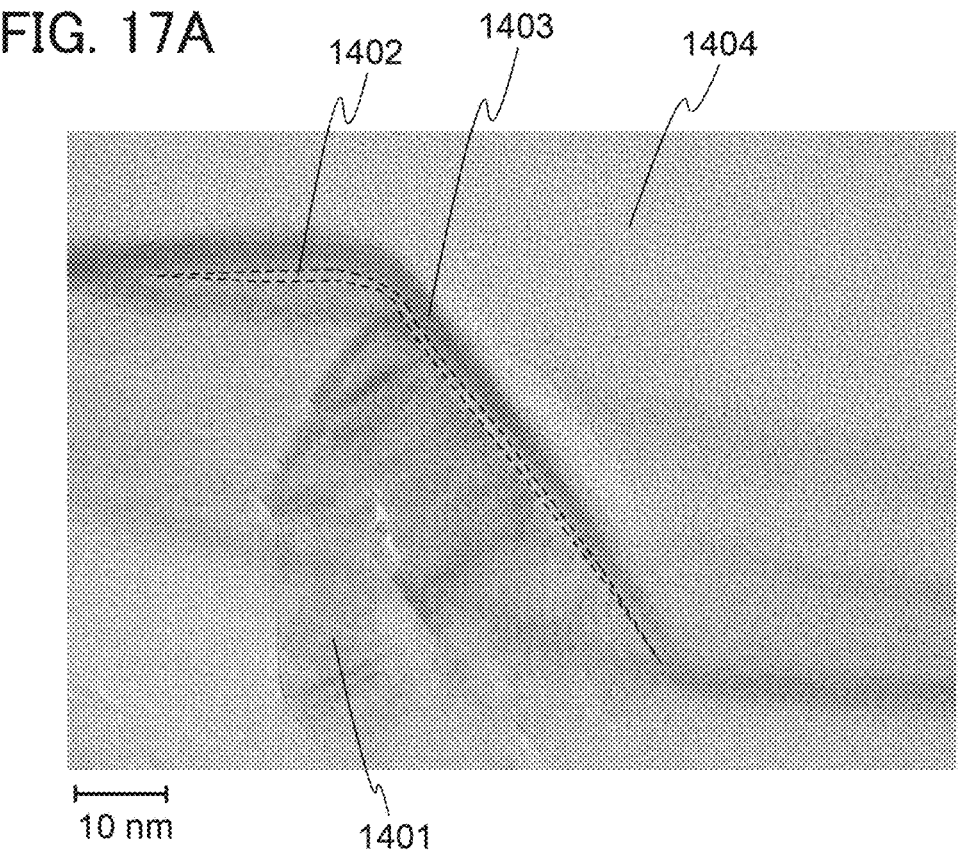
FIGS. 17A and 17B are each a cross-sectional TEM image of an active material.
Figure 17B:
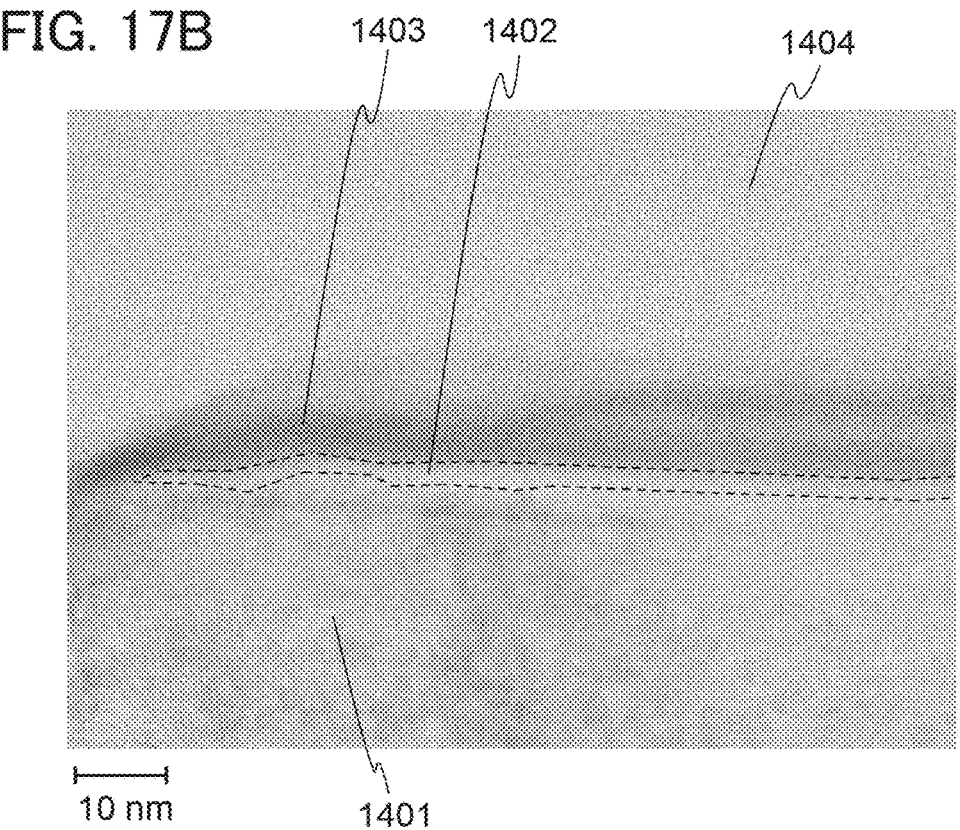

FIGS. 17A and 17B show observation images of the graphite with the film (observed at a magnification of 2,050,000 times) that is used for fabrication of Example A. It is observed that a film 1402 was formed thin and uniformly on the surface of graphite 1401. Furthermore, the thickness of the film 1402 was estimated to be approximately 5 nm or smaller. Note that a film 1403 is a metal film formed for cutting, and a film 1404 is a protective film formed for observation of the cross section.

Figure 18A:
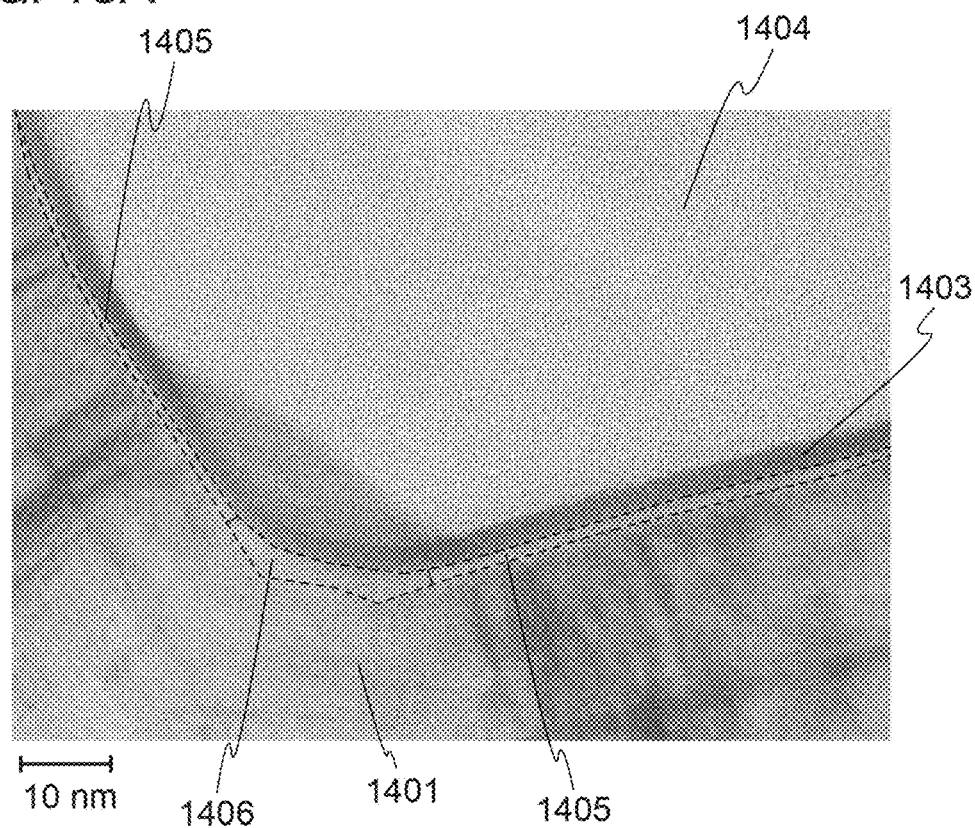
FIGS. 18A and 18B are each a cross-sectional TEM image of an active material.
Figure 18B:
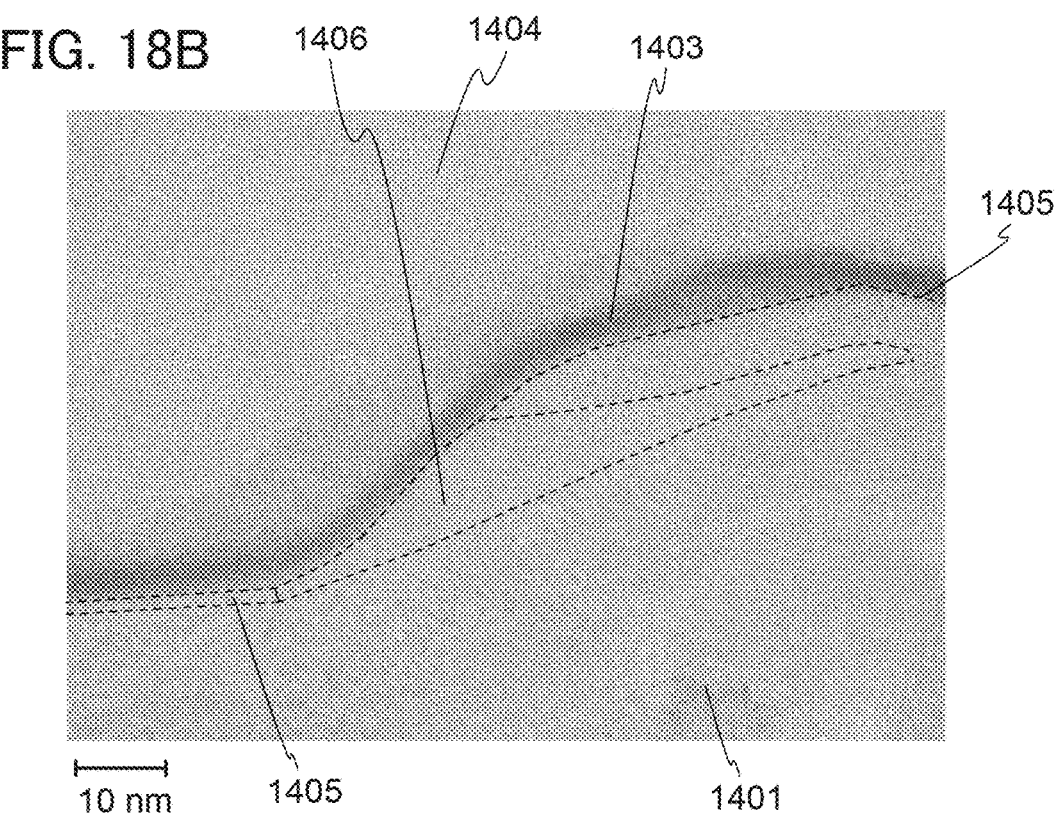

FIGS. 18A and 18B show observation images of the graphite with the film (observed at a magnification of 2,050,000 times) that is used for fabrication of Example B. A film formed on the surface of the graphite 1401 was able to be observed. It is suggested that the thickness may depend on the shape of the surface of the graphite 1401. For example, a film 1405 formed on a substantially flat portion and a projected portion of the surface of the graphite 1401 was a uniform thin film with a thickness of smaller than or equal to 5 nm. In contrast, a film 1406 formed on a depressed portion of the surface of the graphite 1401 was partly thick. Note that a film 1403 is a metal film formed for cutting, and a film 1404 is a protective film for observation of the cross section.

(ToF-SIMS)

Next, the structure of the surface of the graphite with the film that is used for fabrication of Example A was analyzed by ToF-SIMS analysis, and the distribution of a component (SiCH$_3$O$_2$ ions as secondary ions) of silicone used for the film was measured.

Figure 19:
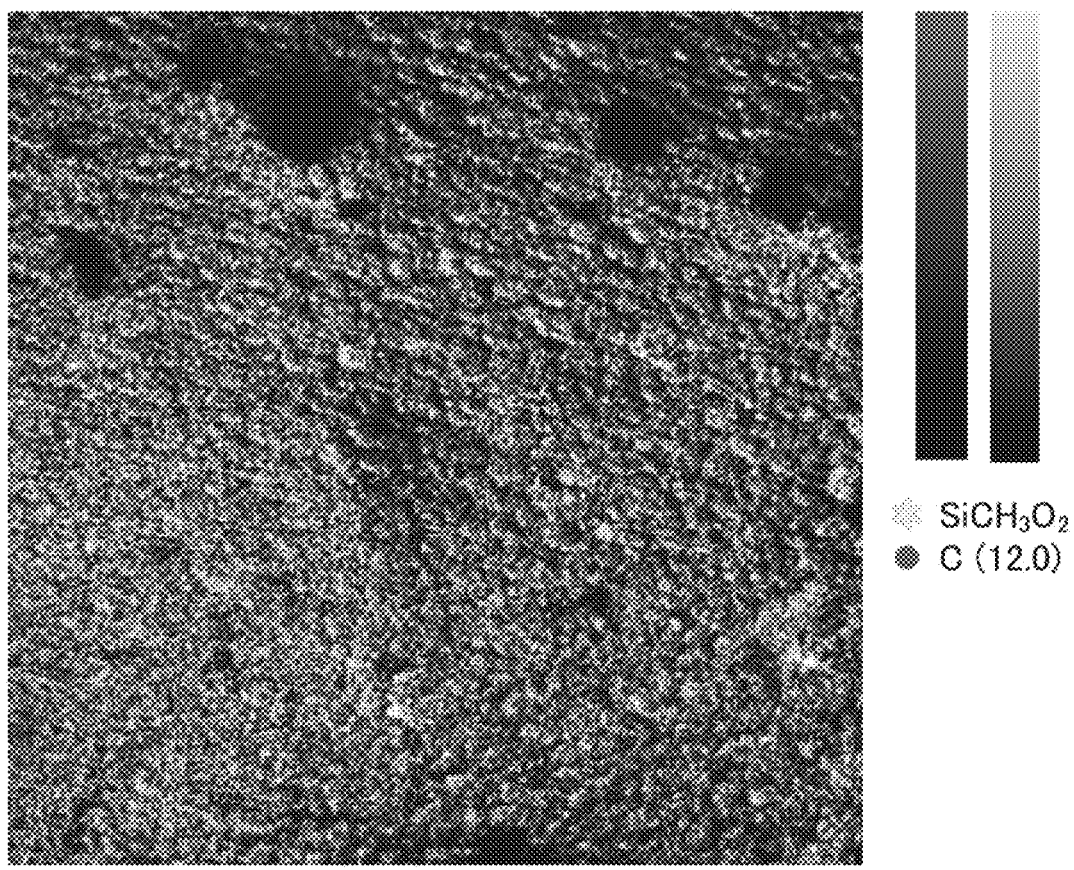
FIG. 19 shows an analysis result by ToF-SIMS.

FIG. 19 shows a ToF-SIMS measurement result (measurement range: 500 μm×500 μm) of the surface of the graphite with the film that is used for fabrication of Example A. SiCH$_3$O$_2$ ions were detected from the entire surface of the graphite with the film. This implies that the film includes silicone used to fabricate Example A and uniformly covers the surface of the graphite. In addition, C ions were also detected from the surface of the graphite with the film. This implies the possibility that the surface of the graphite included an area covered with a very thin portion of the film including silicone or an area not covered with the film.

(180° Peeling Test)

Next, force required to peel an active material layer from a current collector of each of Example A, Example B', and Comparative Example E was measured.

Figure 20A:
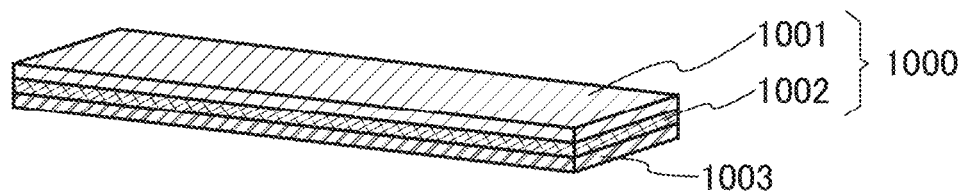
FIGS. 20A to 20C illustrate a method of a separation test.
Figure 20B:
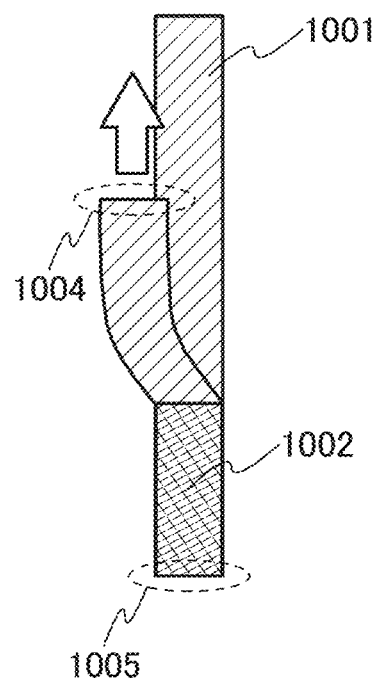
Figure 20C:
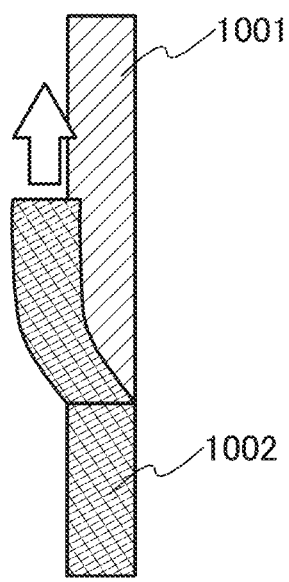

FIGS. 20A to 20C illustrate a method for carrying out a 180° peeling test. In the electrode 1000 used for the test, an active material layer 1002 is formed in contact with one surface of the current collector 1001. The shape of the electrode 1000 was a rectangle with a length of 10 cm to 15 cm and a width of 10 mm. First, an adhesive tape 1003 was adhered to a surface of the active material layer 1002 not in contact with the current collector, so that the active material layer 1002 is fixed (FIG. 20A). As illustrated in FIG. 20B, an end portion 1004 of the current collector was peeled from the active material layer 1002, and the current collector 1001 was folded 180°. The end portion 1004 of the current collector was pulled at a rate of 20 mm/min while an end portion 1005 of the active material layer was fixed, and force required at this time was measured as force required to peel the electrode. For the measurement. EZ graph (produced by SHIMADZU CORPORATION) was used. The direction in which the end portion 1004 of the current collector was pulled was approximately 180° from the direction of the end portion 1005 of the active material layer. Note that FIG. 20C illustrates the state where an electrode layer is similarly peeled and pulled; however, part of the active material layer 1002 is left on the peeled current collector 1001. In this peeling test, part of the active material layer 1002 may be left on the peeled current collector 1001.

The test results are as follows: the average values of force required to peel Example A, Example B', and Comparative example E were 0.30 N, 0.31 N, and 0.22 N, respectively.

These results show that force required to peel the active material layer from the current collector is stronger in the case of the electrode using the active material with the film including silicone than in the case of the electrode using the active material without a film. This suggests that materials in the active material layer were not easily separated from each other in the electrode fabricated using the active material with the film including silicone.

(Measurement of Initial Charge and Discharge Efficiency)

Half cells including Example C, Example D, and Comparative example E as positive electrodes were fabricated to measure the initial charge and discharge efficiencies thereof. Note that the term "half cell" refers to a structure of a lithium-ion battery in which an active material other than a lithium metal is used for a positive electrode and a lithium metal is used for a negative electrode. A lithium metal was used for negative electrodes, and an electrolytic solution formed in such a manner that lithium hexafluorophosphate (LiPF$_6$) was dissolved at a concentration of 1 mol/L in a solution in which EC and DEC were mixed at a volume ratio of 3:7 was used. Polypropylene (PP) and glass fiber filter paper (GF/C) were used as separators. Here, for convenience, the half cell including Example C is referred to as Half cell C. The half cell including Example D is referred to as Half cell D. The half cell including Comparative example E is referred to as Half cell E.

Next, Half cells C, D, and E that were fabricated were charged and discharged. The measurement temperature was 25° C. Here, a charge rate and a discharge rate will be described. For example, in the case of charging a secondary battery with a certain capacity X [Ah] at a constant current, a charge rate of 1 C means the current value I [A] at which charging is terminated in exactly 1 h, and a charge rate of 0.1 C means I/10 [A] (i.e., the current value at which charging is terminated in exactly 10 h). Similarly, a discharge rate of 1 C means the current value I [A] at which discharging is ended in exactly 1 h, and a discharge rate of 0.1 C means I/10 [A] (i.e., the current value at which discharging is ended in exactly 10 h). The conditions for charge and discharge in the first and second cycles are as follows. The discharge (Li intercalation) was performed in the following manner: constant current discharge was performed at a rate of 0.1 C until the voltage decreased and reached 0.01 V, and then, constant voltage discharge was performed at 0.01 V until the current value decreased and reached a current value corresponding to 0.01 C. As the charge (Li deintercalation), constant current charge was performed at a rate of 0.1 C until the voltage increased and reached 1 V. The charge capacity with respect to the discharge capacity in the first cycle is initial charge and discharge efficiency (charge capacity discharge capacity×100 [%]).

The initial charge and discharge efficiencies of Half cells C, D, and E were 97.6%, 97.8%, and 97.3%, respectively.

The results indicate that the initial charge and discharge efficiencies of Half cells C and D were higher than that of Half cell E. The use of the active material with the film for the electrodes increased initial charge and discharge efficiency. This suggests that the use of an active material with a film for an electrode inhibits the decomposition of an electrolytic solution compared with the use of an active material without a film for an electrode.

Furthermore, the initial charge and discharge efficiency of Half cell D was higher than that of Half cell C. This implies that Example D using silicone KR-9218 inhibited the decomposition of an electrolytic solution more effectively than Example C using silicone KR-400.

KR-9218 is silicone having a methyl group, a phenyl group, and a methoxy group, and KR-400 is silicone having a methyl group. Thus, there is a possibility that the existence or absence of one or both of a phenyl group and a methoxy group as substituents affected the difference in function of inhibiting the decomposition of the electrolytic solution. Furthermore, it is suggested that when silicone has a hydrophobic functional group such as a phenyl group, adhesion to graphite might be increased owing to hydrophobic interaction.

(Evaluation of Cycle Performance)

Next, a full cell including Example A as a negative electrode, an electrolytic solution, a separator, and a positive electrode was fabricated and charged and discharged once, whereby Secondary battery A was fabricated. A cycle test was performed on Secondary battery A. In a similar manner, a full cell including Example B as a negative electrode, an electrolytic solution, a separator, and a positive electrode were fabricated and charged and discharged once, whereby Secondary battery B was fabricated. A cycle test was performed on Secondary battery B. In a manner similar to those of Secondary batteries A and B, Secondary battery E using Comparative example E was fabricated, and a cycle test was performed on Secondary battery E.

The cells used for the cycle tests were laminated cells. For each positive electrode, LiFePO$_4$ as an active material, graphene oxide as a conductive additive, PVdF as a binder were used to form a paste in which the weight ratio of graphite to graphene oxide and PVdF was 94.2:0.8:5. As a solvent of the paste, NMP was used.

Note that LiFePO$_4$ coated with carbon with the use of a raw material to which glucose was added was used as LiFePO$_4$. First, NMP was added as a solvent to carbon-coated LiFePO$_4$ to which graphene oxide was added and the mixture was kneaded. After an NMP solution in which PVdF was dissolved was added to the mixture, NMP was further added and mixing was performed to form a paste. The paste was applied to a current collector, and heated at 65° C. in an air atmosphere for 15 minutes and further heated at 70° C. in an air atmosphere for 15 minutes, so that a positive electrode active material layer was formed over the current collector.

The current collector and the active material layer were soaked in a mixed solvent 1 containing water, 13.5 g/L of 77 mmol/L ascorbic acid, and 89 mmol/L ammonia, and they were reacted with each other in a hot-water bath at 80° C. for 15 minutes, so that the graphene oxide was reduced. That is to say, the graphene oxide was reduced by chemical reduction. Then, they were soaked in ethanol to be washed. Then, they were heated at 170° C. under reduced pressure (in vacuum) for 10 hours. After that, they were pressed, so that a positive electrode was formed. The positive electrode includes an active material layer obtained by performing chemical reduction and thermal reduction in this order on an active material layer including graphene oxide.

An electrolytic solution was formed in such a manner that LiPF$_6$ was dissolved at a concentration of 2 wt % in a solution in which EC and EMC were mixed at a weight ratio of 1:1 and 1 wt % of vinylene carbonate was added to the mixed solution. As the separator, polypropylene was used.

In this example, charge and discharge in the first cycle were performed at a constant current of 0.2 C (charging is terminated in 5 hours), and charge and discharge in the second and the subsequent cycles were performed at a constant current of 0.5 C (charging is terminated in 2 hours) for the cycle tests. In all the cycles, the voltage range was from 2 V to 4 V, and the ambient temperature was 60° C.

Figure 21A:
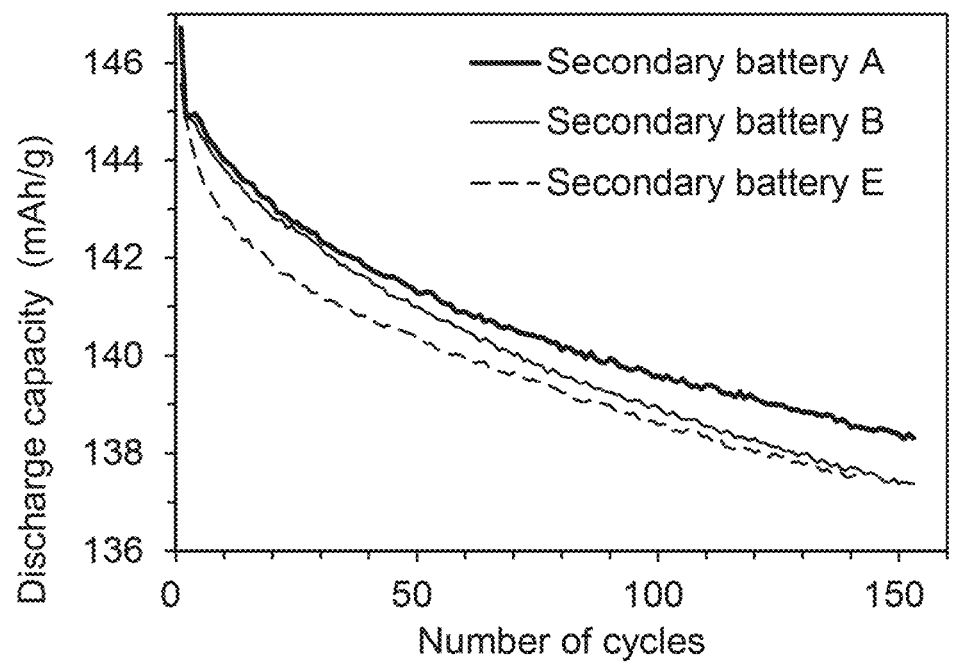
FIGS. 21A and 21B show cycle performances.
Figure 21B:
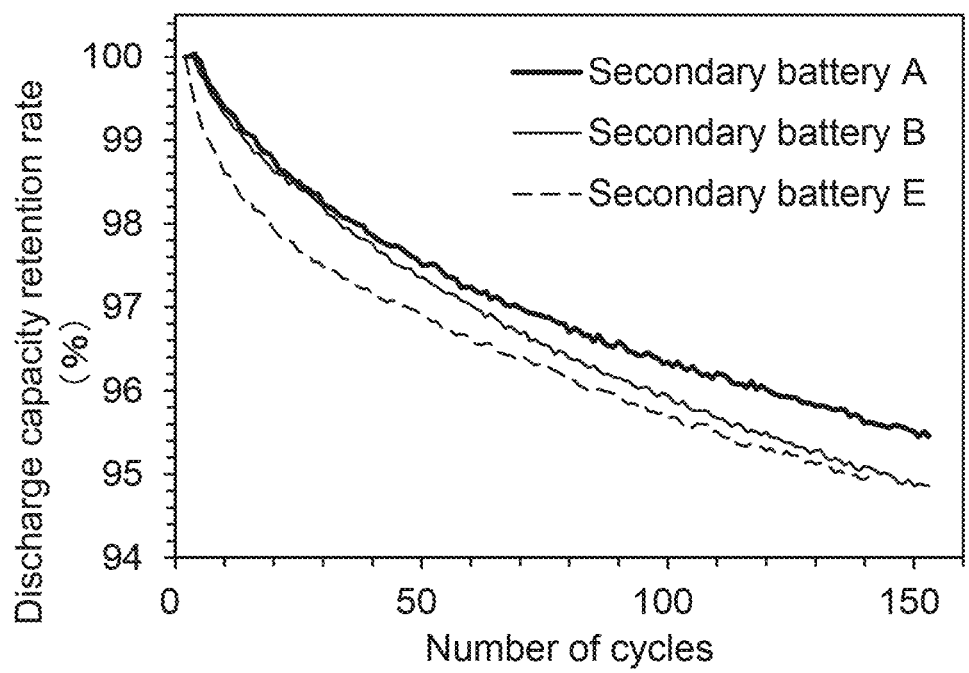

FIGS. 21A and 21B show measurement results of the cycle tests. In FIG. 21A, the horizontal axis represents the number of cycles (times) and the vertical axis represents discharge capacity (mAh/g) of the secondary batteries. In FIG. 21B, the horizontal axis represents the number of cycles (times) and the vertical axis represents discharge capacity retention rates (%) of the secondary batteries. Here, the discharge capacity retention rate refers to the proportion of discharge capacity to the discharge capacity in the second cycle. For example, the discharge capacity retention rate in the N-th cycle can be calculated by the following formula: the discharge capacity in the N-th cycle÷the discharge capacity in the second cycle×100[%].

It is found from FIG. 21A that the discharge capacities of Secondary batteries A and B were higher than that of Secondary battery E. This implies that forming silicone on the surface of graphite allowed fabrication of the power storage device whose discharge capacity does not easily decrease even when it was used at a high temperature of 60° C. It is also implied that forming silicone on the surface of graphite inhibited the decomposition of the electrolytic solution.

Furthermore, it is found from FIG. 21B that the discharge capacity of Secondary battery A was inhibited from decreasing as the number of cycles increased compared with the discharge capacity of Secondary battery E. This suggests that covering graphite with KR-400 improved the cycle performance of the power storage device.

It is also found from FIG. 21B that the discharge capacity of Secondary battery B was inhibited from decreasing as the number of earlier cycles increased compared with the discharge capacity of Secondary battery E. This result and the measurement result of the initial charge and discharge efficiencies suggest that covering graphite with KR-9218 inhibited decrease in initial discharge capacity.

Example 2

In Example 2, a result of a test on Example F fabricated using KR-251 (manufactured by Shin-Etsu Chemical Co., Ltd.) will be described.

KR-251 contains a solvent and silicone having a methyl group like KR-400 but has viscosity and specific gravity different from those of KR-400. KR-400 has specific gravity of 0.98 and a viscosity of 1.2 mPa·s, whereas KR-251 contains toluene and has specific gravity of 0.92 and a viscosity of 18 mPa·s.

Example F

Example F is an electrode fabricated using KR-251 by a method similar to the fabricating method for Example C or D.

(Evaluation of Cycle Performance by Measurement Using Half Cells)

Figure 22:
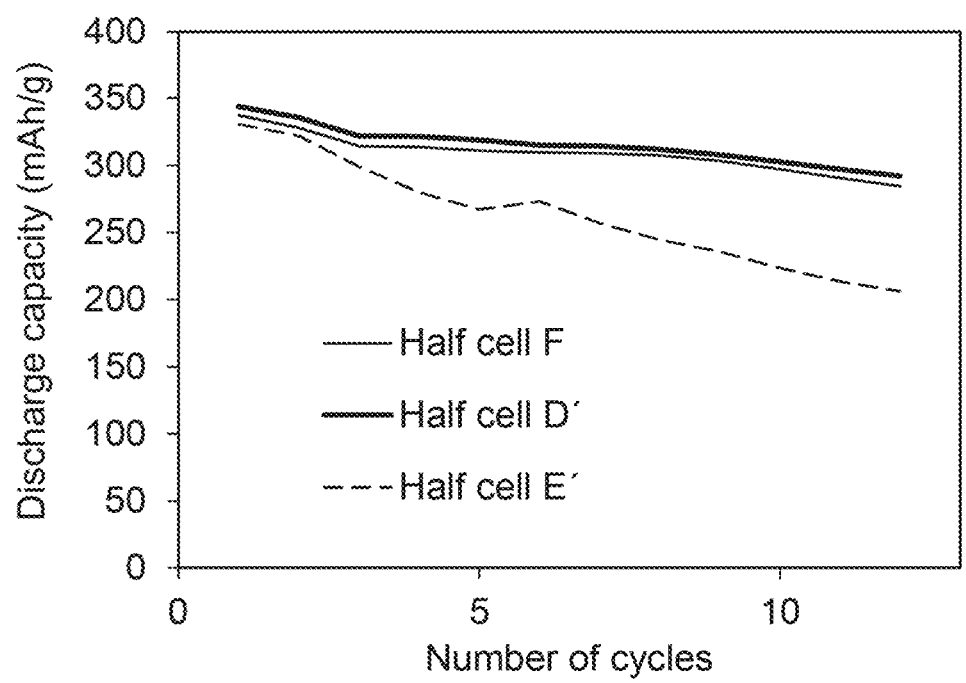
FIG. 22 illustrates the cycle performances of half cells.

To evaluate Example F, a half cell including Example F was fabricated under the same conditions as those in Example 1. FIG. 22 shows a discharge curve of the half cell including Example F and discharge curves of half cells including Example D and Comparative example E. Table 2 lists the fabricating conditions for Example F, Example D, and Comparative example E.

TABLE 1

|  | Example F | Example D | Example E |
|---|---|---|---|
| silicone | KR-251 | KR-9218 | — |
| proportion of silicone | 0.5 wt % | 0.5 wt % | — |

Note that in this example, the half cell including Example F, the half cell including Example D, and the half cell including Comparative example E are referred to as Half cell F, Half cell D', and Half cell E', respectively.

In this example, charge and discharge in the first and second cycles were performed at a constant rate of 0.1 C, and charge and discharge in the third and the subsequent cycles were performed at a constant rate of 0.5 C for the cycle tests. In all the cycles, the voltage range was from 0.01 V to 1.0 V, and the ambient temperature was 60° C.

As shown in FIG. 22, decrease in discharge capacity of Half cell F and Half cell D' with increasing number of cycles was inhibited compared with that of Half cell E'. In addition, it is found that the cycle performances of Half cell F and Half cell D' were similar.

The above results reveal that covering graphite with silicone of KR-251 improved the cycle performance of the power storage device including the negative electrode as in the case where graphite was covered with silicone of KR-9218.

KR-251 and KR-9218 have different functional groups. It is found from the above results that KR-251 and KR-9218 have a small difference in the effect of improving cycle performance by covering graphite with silicone. This indicates that the effect of improving cycle performance is less likely to depend on the kind of a functional group of silicone. The reason is presumably as follows.

KR-251 includes silicone having a methyl group, which is a hydrophobic functional group. Such silicone has extremely high adhesion to graphite and VGCF (registered trademark) having the hydrophobic surfaces; thus, the electrical contact between graphite and VGCF (registered trademark) is easily maintained. This allowed prevention of blocking of an electron conduction path in the active material layer. Therefore, the cycle performance of Half cell F including Example F using KR-251 was better than that of Half cell E' including Comparative example E without silicone.

Meanwhile, KR-9218 is amphiphilic silicone, which has a methoxy group, which is a hydrophilic functional group, and a methyl group and a phenyl group, which are hydrophobic functional groups. Such silicone has extremely high adhesion to graphite having the hydrophobic surface and binders having the hydrophilic surfaces, such as CMC-Na and SBR; thus, silicone has an effect of assisting the function of the binders, and can prevent an electron conduction path from being blocked in the active material layer. Therefore, the cycle performance of Half cell D' including Example D using KR-9218 was also improved like that of Half cell F including Example F using KR-251.

This application is based on Japanese Patent Application serial no. 2014-210591 filed with Japan Patent Office on Oct. 15, 2014, the entire contents of which are hereby incorporated by reference.

What is claimed is:

1. An electrode comprising:
   a current collector; and
   an active material layer,
   wherein the active material layer includes an active material, a film of silicone, a conductive additive, and a binder,
   wherein the active material comprises a first active material particle and a second active material particle,
   wherein the film of silicone covers and is in contact with at least a part of the first active material particle,
   wherein the film of silicone is any one of a linear polymer, a circular polymer and a branched polymer,
   wherein the binder covers the part of the first active material particle with the film of silicone interposed between the binder and the part of the first active material particle,
   wherein the first active material particle comprises a first region in contact with the second active material particle,
   wherein the first active material particle comprises a second region in contact with the conductive additive, and
   wherein the first active material particle comprises a third region in contact with the binder.

2. The electrode according to claim 1, wherein the active material includes at least one of graphite, silicon, and silicon monoxide.

3. The electrode according to claim 1, wherein the film of silicone includes a hydrophobic functional group.

4. The electrode according to claim 3, wherein the hydrophobic functional group includes at least one of a phenyl group, an alkyl group, an alkoxy group, a carbonyl group, and an ester group.

5. The electrode according to claim 1, wherein the film of silicone includes a hydrophilic functional group.

6. A power storage device comprising:
   a first electrode; and
   a second electrode,
   wherein the first electrode is one of a positive electrode and a negative electrode,
   wherein the second electrode is another one of the positive electrode and the negative electrode,
   wherein the first electrode includes a current collector and an active material layer,
   wherein the active material layer includes an active material, a silicone film, a conductive additive, and a binder,
   wherein the active material comprises a first active material particle and a second active material particle,
   wherein the silicone film covers and is in contact with at least a part of the first active material particle,
   wherein the silicone film is any one of a linear polymer, a circular polymer and a branched polymer,
   wherein the binder covers the part of the first active material particle with the silicone film interposed between the binder and the part of the first active material particle,
   wherein the first active material particle comprises a first region in contact with the second active material particle,
   wherein the first active material particle comprises a second region in contact with the conductive additive, and
   wherein the first active material particle comprises a third region in contact with the binder.

7. An electronic device comprising:
   the power storage device according to claim 6; and
   at least one of a display panel, a light source, an operation key, a speaker, and a microphone.

8. The electrode according to claim 1, wherein a thickness of the film of silicone is less than or equal to 5 nm.

9. The electrode according to claim 8, wherein the thickness of the film of silicone is greater than or equal to 0.1 nm.

10. The power storage device according to claim 6, wherein a thickness of the silicone film is less than or equal to 5 nm.

11. The power storage device according to claim 10, wherein the thickness of the silicone film is greater than or equal to 0.1 nm.

12. An active material layer comprising:
    an active material;
    a silicone film;
    a conductive additive; and
    a binder,
    wherein the active material comprises a first active material particle and a second active material particle,
    wherein the silicone film covers and is in contact with at least a part of the first active material particle,
    wherein the silicone film is any one of a linear polymer, a circular polymer and a branched polymer,
    wherein the binder covers the part of the first active material particle with the silicone film interposed between the binder and the part of the first active material particle,
    wherein a thickness of the silicone film is less than or equal to 5 nm,
    wherein the first active material particle comprises a first region in contact with the second active material particle,
    wherein the first active material particle comprises a second region in contact with the conductive additive, and
    wherein the first active material particle comprises a third region in contact with the binder.

13. The active material layer according to claim 12, wherein the thickness of the silicone film is greater than or equal to 0.1 nm.

14. The active material layer according to claim 12, wherein the active material includes at least one of graphite, silicon, and silicon monoxide.

15. The active material layer according to claim 12, wherein a material of the silicone film is a polymer having a hydrophobic functional group.

16. The active material layer according to claim 15, wherein the hydrophobic functional group includes at least one of a phenyl group, an alkyl group, an alkoxy group, a carbonyl group, and an ester group.

17. The active material layer according to claim 12, wherein a material of the silicone film is silicone having a hydrophilic functional group.

18. The power storage device according to claim 6, further comprising:
    a solid electrolyte between the first electrode and the second electrode.

19. The power storage device according to claim 6, wherein the binder includes at least one of carboxymethyl cellulose and styrene-butadiene rubber.

20. The electrode according to claim 1, wherein a material of the film of silicone has a polymer structure formed from dehydration condensation of silanol groups.

21. The power storage device according to claim 6, wherein a material of the silicone film has a polymer structure formed from dehydration condensation of silanol groups.

22. The active material layer according to claim 12, wherein a material of the silicone film has a polymer structure formed from dehydration condensation of silanol groups.

* * * * *